(12) United States Patent
    Aronie

(10) Patent No.: US 12,089,784 B2
(45) Date of Patent: Sep. 17, 2024

(54) APPARATUSES AND DEVICES FOR FACILITATING GRINDING OF GRINDABLE MATERIAL

(71) Applicant: Alan Benet Aronie, Concord, MA (US)

(72) Inventor: Alan Benet Aronie, Concord, MA (US)

( * ) Notice: Subject to any disclaimer, the term of this patent is extended or adjusted under 35 U.S.C. 154(b) by 252 days.

(21) Appl. No.: 17/886,497

(22) Filed: Aug. 12, 2022

(65) Prior Publication Data

US 2024/0049914 A1  Feb. 15, 2024

(51) Int. Cl.
    *A47J 42/24* (2006.01)
    *A47J 42/04* (2006.01)
    *B02C 18/04* (2006.01)

(52) U.S. Cl.
    CPC .............. *A47J 42/04* (2013.01); *B02C 18/04* (2013.01)

(58) Field of Classification Search
    CPC ........... A47J 42/24; A47J 42/34; A47J 43/105
    See application file for complete search history.

(56) References Cited

U.S. PATENT DOCUMENTS

| | | | | |
|---|---|---|---|---|
| 23,843 A | * | 5/1859 | Jones | B01F 27/112 366/243 |
| 3,744,767 A | * | 7/1973 | Blasnik | A47J 43/105 366/243 |
| D315,657 S | * | 3/1991 | Ruttimann | D7/412 |
| D396,992 S | * | 8/1998 | Lallemand | D7/372 |
| 5,996,483 A | * | 12/1999 | Yip | A47J 17/02 99/623 |
| 7,673,829 B2 | * | 3/2010 | Holcomb | B26D 3/26 241/292.1 |
| 8,402,886 B2 | * | 3/2013 | Herren | A47J 43/105 241/292.1 |
| 8,635,948 B2 | * | 1/2014 | Herren | A47J 43/046 241/199.2 |
| 9,505,067 B1 | | 11/2016 | Nasiell | |
| 10,349,781 B2 | * | 7/2019 | Riede | F16D 41/185 |
| 2002/0153440 A1 | | 10/2002 | Holcomb et al. | |
| 2008/0164357 A1 | * | 7/2008 | Chau | B26D 5/10 241/285.2 |
| 2014/0217213 A1 | | 8/2014 | Edwards et al. | |
| 2022/0009116 A1 | * | 1/2022 | Qian | B26D 7/2614 |
| 2022/0225830 A1 | * | 7/2022 | Verbrugge | A47J 43/044 |

FOREIGN PATENT DOCUMENTS

WO   WO-2020226967 A1 * 11/2020 .......... B01F 15/0233

\* cited by examiner

*Primary Examiner* — Faye Francis
(74) *Attorney, Agent, or Firm* — Dhiraj Jindal; PATENT YOGI LLC

(57) ABSTRACT

Disclosed herein is an apparatus for facilitating grinding of grindable material. The apparatus including a container, a lid, a blade assembly, a secondary blade, and a rotating assembly. Further, the container receives the grindable material in a container interior space through a container opening of the container. Further, the lid removably attaches to a container side wall of the container for openably closing the container opening. Further, the blade assembly rotatably positioned within the container interior space. Further, the secondary blade is attached to and extends laterally from the container side wall in the container interior space. Further, the secondary blade is vertically spaced from blades of the blade assembly by a secondary vertical distance. Further, a rotating mechanism of the rotating assembly couples with the blade assembly for rotating the blade assembly based on a pull force received by a pull cord of the rotating assembly.

20 Claims, 26 Drawing Sheets

APPARATUSES AND DEVICES FOR FACILITATING GRINDING OF GRINDABLE MATERIAL

FIELD OF THE INVENTION

Generally, the present disclosure relates to the field of foods and beverages: apparatus. More specifically, the present disclosure relates to apparatuses and devices for facilitating grinding of grindable material.

BACKGROUND OF THE INVENTION

Existing grinders are designed for grinding specific types of materials. As a result a different kind of grinder is needed for grinding smaller herbs. Also, the existing grinders are designed with a single blade assembly making the grinding quite ineffective. As a result, a different combination of blade assemblies is needed for the effective grinding of the herbs.

Therefore, there is a need for improved apparatuses and devices for facilitating grinding of grindable material that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating grinding of grindable material, in accordance with some embodiments. Accordingly, the apparatus may include a container, a lid, a blade assembly, a secondary blade, and a rotating assembly. Further, the container may include a container base and a container side wall extending upwards from the container base. Further, the container base and the container side wall define a container interior space and the container side wall defines a container opening leading into the container interior space. Further, the container may be configured for receiving at least one grindable material in the container interior space through the container opening. Further, the lid may be configured to be removably attached to the container side wall for openably closing the container opening. Further, the blade assembly may be rotatably positioned within the container interior space. Further, the blade assembly may include a shaft and a pair of blades attached to the shaft and extending laterally oppositely from the shaft. Further, the pair of blades may be vertically spaced by a vertical distance. Further, the secondary blade may be attached to the container side wall and extends laterally from the container side wall in the container interior space. Further, the secondary blade may be vertically spaced from each of the pair of blades by a secondary vertical distance. Further, the rotating assembly may be attached to the container base. Further, the rotating assembly may include a rotating mechanism and a pull cord. Further, the rotating mechanism may be coupled with the blade assembly. Further, the pull cord may be operably coupled with the rotating mechanism. Further, the rotating mechanism may be configured for rotating the blade assembly for rotating the pair of blades based on a pull force received by the pull cord. Further, the pair of blades and the secondary blade grind the at least one grindable material in the container interior space based on the rotating of the pair of blades.

Further disclosed herein is an apparatus for facilitating grinding of grindable material, in accordance with some embodiments. Accordingly, the apparatus may include a container, a lid, a blade assembly, a secondary blade, and a rotating assembly. Further, the container may include a container base and a container side wall extending upwards from the container base. Further, the container base and the container side wall define a container interior space and the container side wall defines a container opening leading into the container interior space. Further, the container may be configured for receiving at least one grindable material in the container interior space through the container opening. Further, the lid may be configured to be removably attached to the container side wall for openably closing the container opening. Further, the blade assembly may be rotatably positioned within the container interior space. Further, the blade assembly may include a shaft and a pair of blades attached to the shaft and extending laterally oppositely from the shaft. Further, the pair of blades may be vertically spaced by a vertical distance. Further, the pair of blades may include a first blade and a second blade. Further, the first blade may be vertically spaced above the second blade. Further, the second blade may be vertically spaced from the container base by a first vertical distance. Further, the first vertical distance ranges between 1 millimeter to 2 millimeters. Further, the secondary blade may be attached to the container side wall and extends laterally from the container side wall in the container interior space. Further, the secondary blade may be vertically spaced from each of the pair of blades by a secondary vertical distance. Further, the secondary vertical distance between the secondary blade and each of the pair of blades ranges between 1 millimeter to 3 millimeters. Further, the rotating assembly may be attached to the container base. Further, the rotating assembly may include a rotating mechanism and a pull cord. Further, the rotating mechanism may be coupled with the blade assembly. Further, the pull cord may be operably coupled with the rotating mechanism. Further, the rotating mechanism may be configured for rotating the blade assembly for rotating the pair of blades based on a pull force received by the pull cord. Further, the pair of blades and the secondary blade grind the at least one grindable material in the container interior space based on the rotating of the pair of blades.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
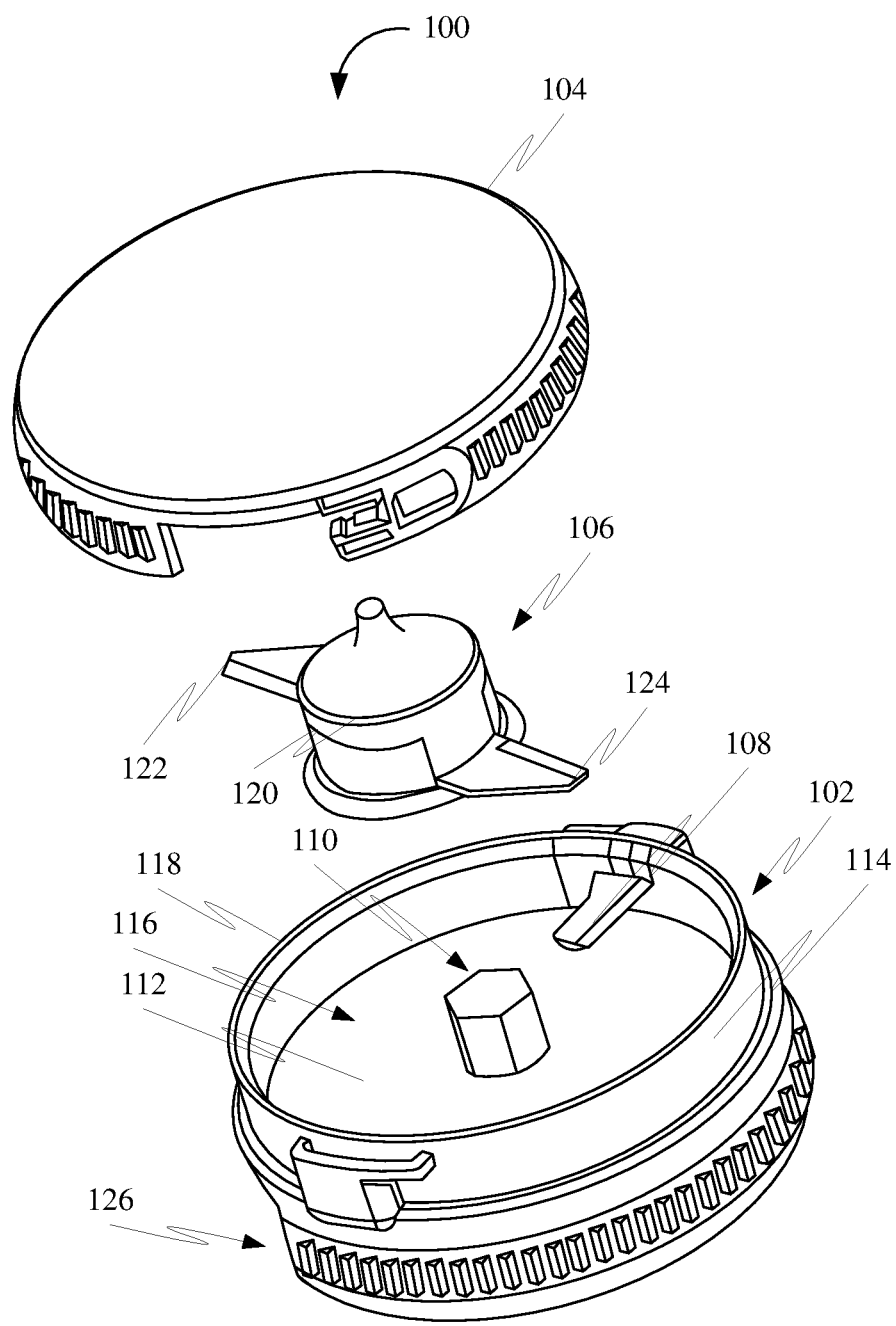
FIG. 1 is a right side perspective exploded view of an apparatus for facilitating grinding of grindable material, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of apparatuses and devices for facilitating grinding of grindable material, embodiments of the present disclosure are not limited to use only in this context.

Overview

The present disclosure describes apparatuses and devices for facilitating grinding of grindable material.

Further, the present disclosure describes a handheld pull cord herb grinder for fibrous and soft herbs. Further, the grinder addresses many of the traditional issues with existing small herb grinders such as clogging, cleaning, ease of use, fast grind, and easy access to freshly ground materials.

Further, a pull cord of the grinder has a generous cord pull handle so the user can easily pull hard enough to cut through and grind very fibrous or tough materials. Further, the pull cord handle retracts and fits securely against a grinder bottom of the grinder.

Further, the grinder may include a clutch. Further, the clutch design is robust and engages a winder of the grinder at the winder's outer diameter, so that maximum mechanical advantage is transferred to the cutting blades of the grinder.

Further, the grinder may include clutch locks and the clutch locks may include a small boss on the underside of the clutch locks that engage with groves in the face of the winder so when the pull cord, that is wound on the winder, is pulled, the clutch locks are pivoted out against lock walls of the winder.

Further, when the pull cord is pulled, a spring of the grinder recessed under the winder for compact design, winds up, and then when the pull cord is allowed to retract, the spring rotates the winder so that the clutch locks disengage, and the clutch and a blade hub assembly comprising the cutting blades freewheel. Further, the blade assembly only engages when the winder is pulled in a counterclockwise direction looking down at a top of the grinder. Further, the cutting blades are steel blades that are spaced 1 to 3 mm above and below a fixed steel blade of the grinder and 1 to 2 mm above a floor of a grinder middle part of the grinder so that a fine grind is achieved. Further, the closer the spacing of the cutting blades the finer the grind will be. Further, the top turns to lock onto the grinder middle part, and a blade hub of the blade assembly keys onto a hexagonal top of the clutch. Further, the blade hub is removable for easy cleaning. Further, the top becomes a receptacle for the ground material by simply turning the grinder upside-down and then removing the top so that all the ground material is now easily accessible.

Further, the present disclosure describes a handheld pull cord herb grinder. Further, the grinder may include a top clear plastic, two stainless steel blades, a blade hub, a stainless fixed opposing blade, a grinder middle, a clutch, three clutch locks, a winder, a spring, a grinder bottom, a steel shaft, a cord pull, and a cord guide. Further, the pull cord is wound around the winder. Further, a boss on the clutch locks engages a face of the winder to open and closes. Further, the face may include winder grooves to engage the boss. Further, the winder turns or rotates in the counterclockwise direction when the pull cord is pulled. The clutch locks engage on the winder when the winder is turning clockwise. And the winder turns in the clockwise direction when the pull cord is released and when the winder turns in the clockwise direction the clutch freewheels. Further, the spring is attached to the grinder bottom and the spring is attached to the winder. Further, the counterclockwise turning of the winder winds up the spring.

FIG. 1 is a right side perspective exploded view of an apparatus 100 for facilitating grinding of grindable material, in accordance with some embodiments. Accordingly, the apparatus 100 may include a container 102, a lid 104, a blade assembly 106, a secondary blade 108, and a rotating assembly 110. Further, the apparatus 100 may be a handheld apparatus.

Further, the container 102 may include a container base 112 and a container side wall 114 extending upwards from the container base 112. Further, the container base 112 and the container side wall 114 define a container interior space 116 and the container side wall 114 defines a container opening 118 leading into the container interior space 116. Further, the container 102 may be configured for receiving at least one grindable material in the container interior space 116 through the container opening 118. Further, the at least one grindable material may include at least one smaller herb, at least one plant matter, at least one animal matter, etc.

Further, the lid 104 may be configured to be removably attached to the container side wall 114 for openably closing the container opening 118.

Further, the blade assembly 106 may be rotatably positioned within the container interior space 116. Further, the blade assembly 106 may include a shaft 120 and a pair of blades 122-124 attached to the shaft 120 and extending laterally oppositely from the shaft 120. Further, the pair of blades 122-124 may be vertically spaced by a vertical distance.

Further, the secondary blade 108 may be attached to the container side wall 114 and extends laterally from the container side wall 114 in the container interior space 116. Further, the secondary blade 108 may be vertically spaced from each of the pair of blades 122-124 by a secondary vertical distance. Further, the rotating assembly 110 may be attached to the container base 112. Further, the secondary blade 108 opposes the pair of blades 122-124.

Further, the rotating assembly 110 may include a rotating mechanism and a pull cord 206. Further, the rotating mechanism may be coupled with the blade assembly 106. Further, the pull cord 206 may be operably coupled with the rotating mechanism. Further, the rotating mechanism may be configured for rotating the blade assembly 106 for rotating the pair of blades 122-124 based on a pull force received by the pull cord 206. Further, the pair of blades 122-124 and the secondary blade 108 grind the at least one grindable material in the container interior space 116 based on the rotating of the pair of blades 122-124.

Further, in some embodiments, the apparatus 100 may include a housing 126. Further, the housing 126 may include a housing base 302 and a housing side wall 304 extending upwards from the housing base 302. Further, the housing side wall 304 may be attached to the container base 112. Further, the housing base 302, the housing side wall 304, and the container base 112 define a housing interior space 306. Further, the rotating mechanism may be disposed within the housing interior space 306.

Further, in an embodiment, the housing side wall 304 may be detachably attached to the container base 112.

Further, in an embodiment, the housing 126 may include a housing shaft 308 and a winder 204. Further, the housing shaft 308 may be disposed in the housing interior space 306. Further, the housing shaft 308 may be attached to the housing base 302 and perpendicularly extends from the housing base 302. Further, the housing shaft 308 may include a fixed end 310 attached to the housing base 302 and a free end 312. Further, the winder 204 may be coaxially and rotatably disposed around the housing shaft 308 in the housing interior space 306. Further, the winder 204 may be cylindrically shaped. Further, the winder 204 may include at least one annular groove on a curved surface of the winder 204. Further, a first end 1702 of the pull cord 206 may be coupled to the winder 204 and a second end 1704 extends exterior to the housing 126 through a housing opening 1302 in the housing side wall 302 and attached to a handle 210. Further, the pull cord 206 receives the pull force through the handle 210. Further, the at least one annular groove receives at least one portion of the pull cord 206 for winding the at least one portion of the pull cord 206 around the winder 204. Further, the at least one portion of the pull cord 206 unwinds based on the pull force received by the pull cord 206 using the handle 210 for rotating the winder 204 in a counterclockwise direction. Further, the rotating of the blade assembly 106 may be based on the rotating of the winder 204 in the counterclockwise direction.

Further, in an embodiment, the rotating mechanism further may include a spiral spring 208 coaxially disposed around the housing shaft 308 between the housing base 302 and the winder 204. Further, a first end 1602 of the spiral spring 208 may be attached to the housing shaft 308 and a second end 1604 of the spiral spring 208 may be attached to the winder 204. Further, the spiral spring 208 may be configured for transitioning from an expanded state to a compressed state based on the rotating of the winder 204 in the counterclockwise direction. Further, the spiral spring 208 may be configured for transitioning from the compressed state to the expanded state based on a removal of the pull force. Further, the spiral spring 208 may be configured for rotating the winder 204 in a clockwise direction for rewinding the at least one portion of the pull cord 206 around the winder 204 based on the transitioning of the spiral spring 208 from the compressed state to the expanded state.

Further, in an embodiment, the rotating mechanism further may include a clutch assembly 202 disposed on the winder 204. Further, the clutch assembly 202 may be configured for coupling the blade assembly 106 with the winder 204. Further, the rotating of the blade assembly 106 based on the rotating of the winder 204 in the counterclockwise direction may be based on the coupling. Further, the clutch assembly 202 may be configured for providing a mechanical advantage for the rotating of the blade assembly 106 based on the rotating of the winder 204 in the counterclockwise direction.

Further, in an embodiment, the clutch assembly 202 may include a clutch 314. Further, the clutch 314 may include a clutch stud 1514 and a plurality of clutch blades 1502-1506 attached to a bottom portion 1516 of the clutch stud 1514 and extends radially from the bottom portion 1516 of the clutch stud 1514. Further, the clutch 314 may include a clutch space (1508, 1510, and 1512) adjacent to each of the plurality of clutch blades 1502-1506. Further, the clutch stud 1514 may be rotatably mounted on the free end 312 of the housing shaft 308. Further, a top portion 1518 of the clutch stud 1514 extends into the container interior space 116 through a base opening 322 in the container base 112. Further, the shaft 120 of the blade assembly 106 may be configured to be attached to the top portion 1518 of the clutch stud 1514.

Further, in an embodiment, the clutch assembly 202 may include a plurality of clutch locks 316-320. Further, each of the plurality of clutch locks 316-320 may be pivotably disposed in the clutch space (1508, 1510, and 1512). Further, each of the plurality of clutch locks 316-320 may include a boss 1802. Further, the boss 1802 engages with one of a plurality of grooves 2310-2314 radially disposed on a top surface 2308 of the winder 204. Further, each of the plurality of clutch locks 316-320 pivots to an engaging position for engaging with a plurality of lock walls 2302-2306 peripherally disposed on the top surface 2308 of the winder 204 based on the rotating of the winder 204 in the counterclockwise direction. Further, the engaging of each of the plurality of clutch locks 316-320 with the plurality of lock walls 2302-2306 rotates the clutch assembly 202 with the winder 204 for the rotating of the blade assembly 106. Further, each of the plurality of locks pivots to a disengaging position for disengaging with the plurality of lock walls 2302-2306 based on the rotating of the winder 204 in the counterclockwise direction. Further, the disengaging of each of the plurality of clutch locks 316-320 with the plurality of lock walls 2302-2306 does not rotate the clutch assembly 202 with the winder 204.

Further, in an embodiment, the providing of the mechanical advantage for the rotating of the blade assembly 106 may be based on the engaging of each of the plurality of clutch locks 316-320 with the plurality of lock walls 2302-2306. Further, the mechanical advantage corresponds to a radial distance of the plurality of lock walls 2302-2306 on the top surface 2308 of the winder 204 from a center 2316 of the top surface 2308 of the winder 204. Further, the radial distance may be a maximum radial distance based on the peripherally disposing of the plurality of lock walls 2302-2306 on the top surface 2308 of the winder 204. Further, the mechanical advantage may be a maximum mechanical advantage corresponding to the maximum radial distance based on the peripherally disposing of the plurality of lock walls 2302-2306 on the top surface 2308 of the winder 204.

Further, in an embodiment, the shaft 120 of the blade assembly 106 may be configured to be removably attached with the top portion 1518 of the clutch stud 1514 for detachably coupling the blade assembly 106 to the rotating assembly 110.

Further, in some embodiments, the secondary vertical distance between the secondary blade 108 and each of the pair of blades 122-124 ranges between 1 millimeter to 3 millimeters.

Further, in some embodiments, the pair of blades 122-124 may include a first blade 122 and a second blade 124. Further, the first blade 122 may be vertically spaced above the second blade 124. Further, the second blade 124 may be vertically spaced from the container base 112 by a first vertical distance. Further, the first vertical distance ranges between 1 millimeter to 2 millimeters.

Figure 2:
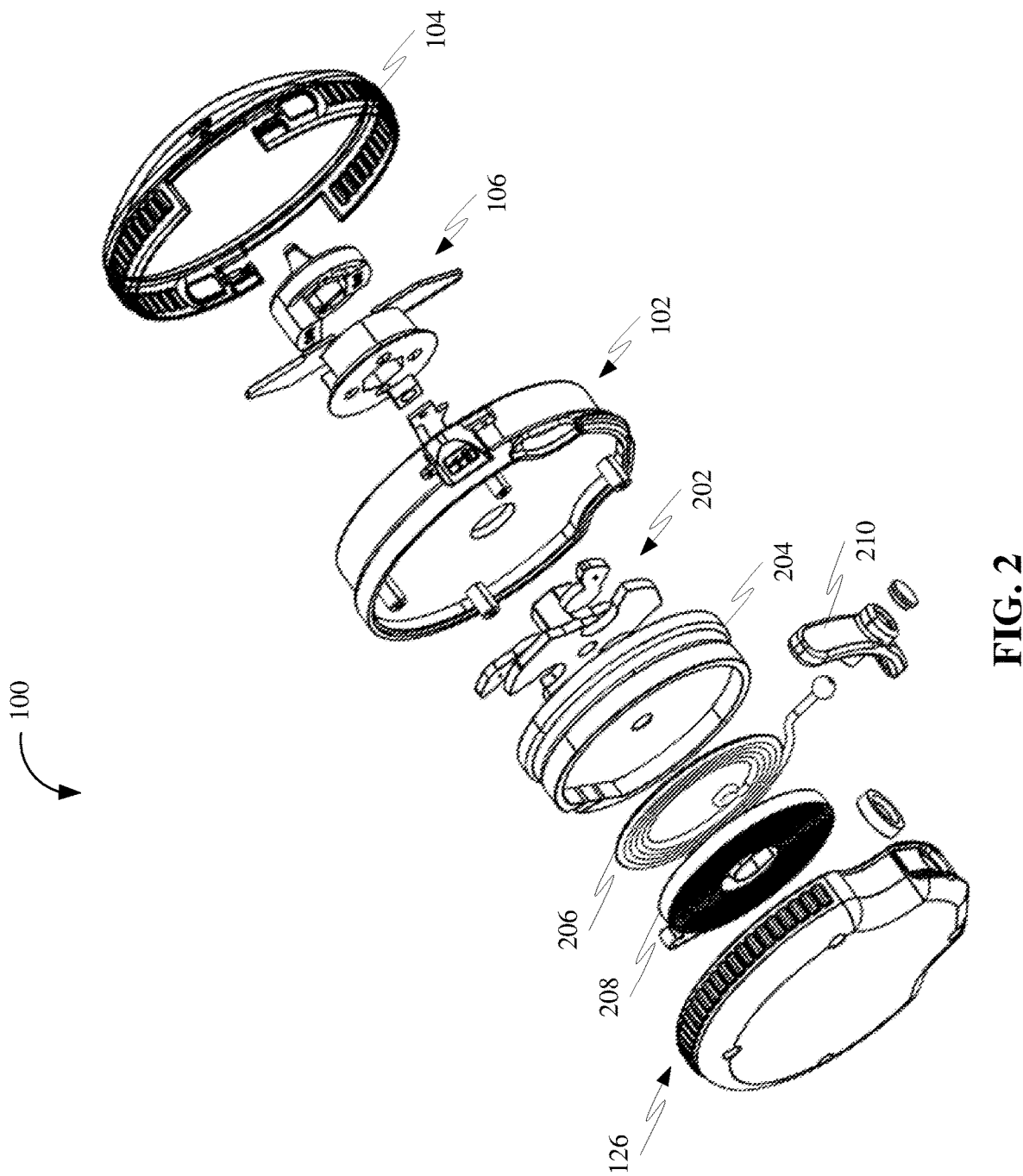
FIG. 2 is a left side bottom perspective exploded view of the apparatus, in accordance with some embodiments.

FIG. 2 is a left side bottom perspective exploded view of the apparatus 100, in accordance with some embodiments.

Figure 3:
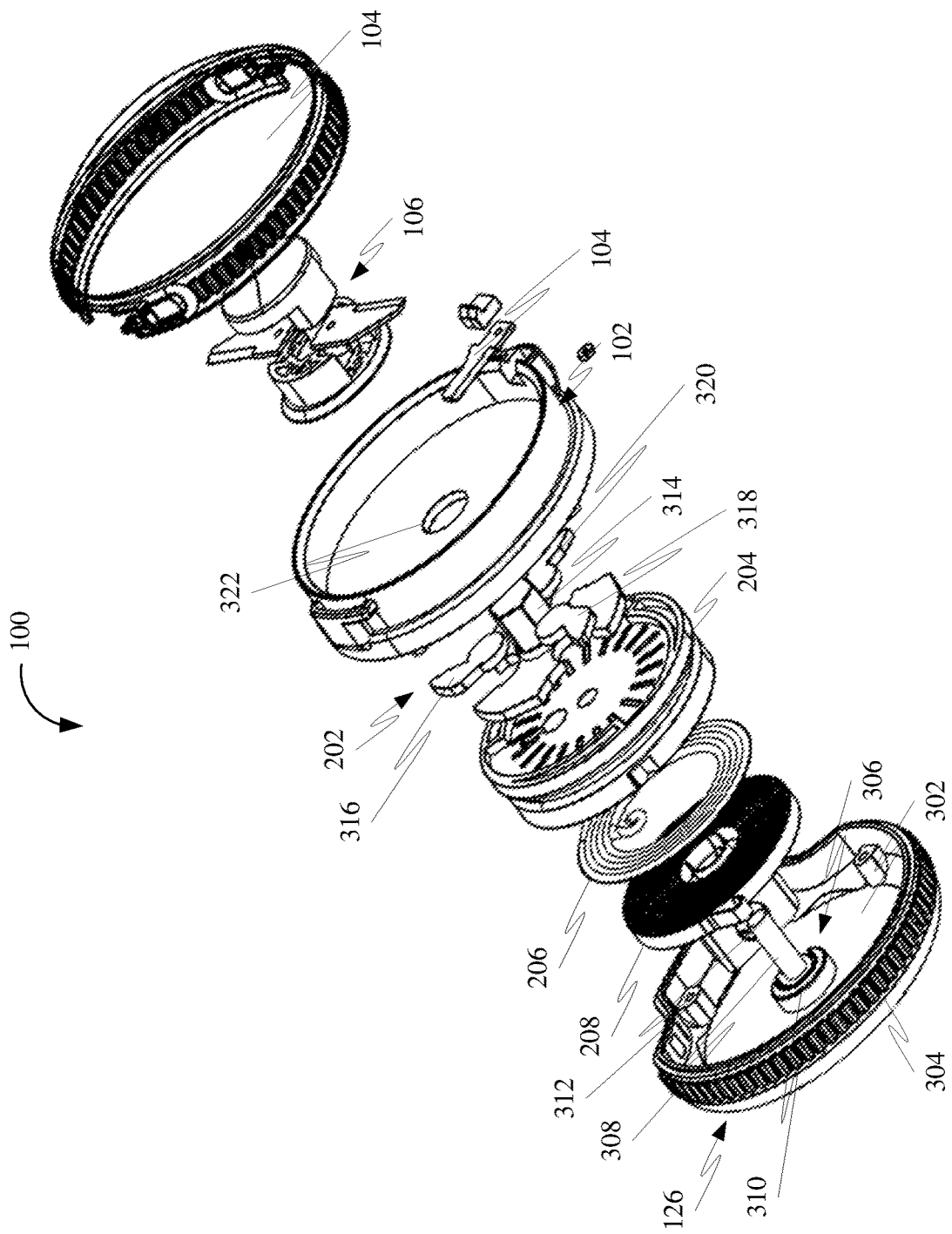
FIG. 3 is a left side top perspective exploded view of the apparatus, in accordance with some embodiments.

FIG. 3 is a left side top perspective exploded view of the apparatus 100, in accordance with some embodiments.

Figure 4:
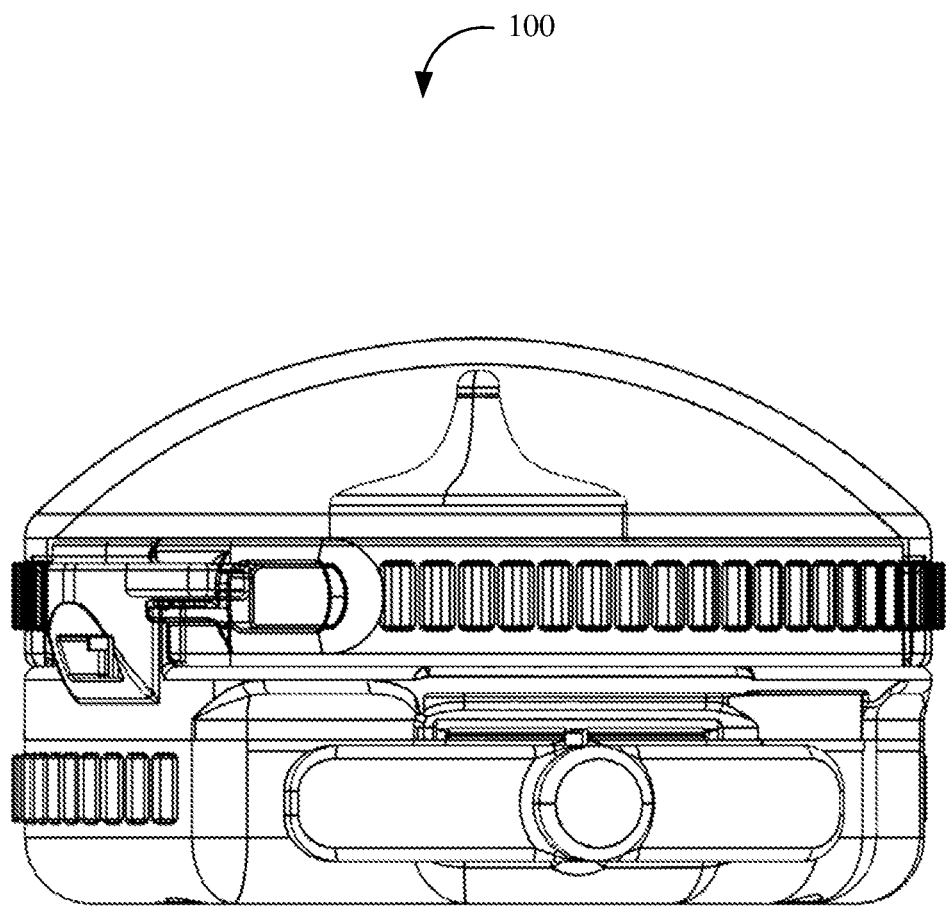
FIG. 4 is a front view of the apparatus, in accordance with some embodiments.

FIG. 4 is a front view of the apparatus 100, in accordance with some embodiments. FIG. 4 is an assembled view of the apparatus 100.

Figure 5:
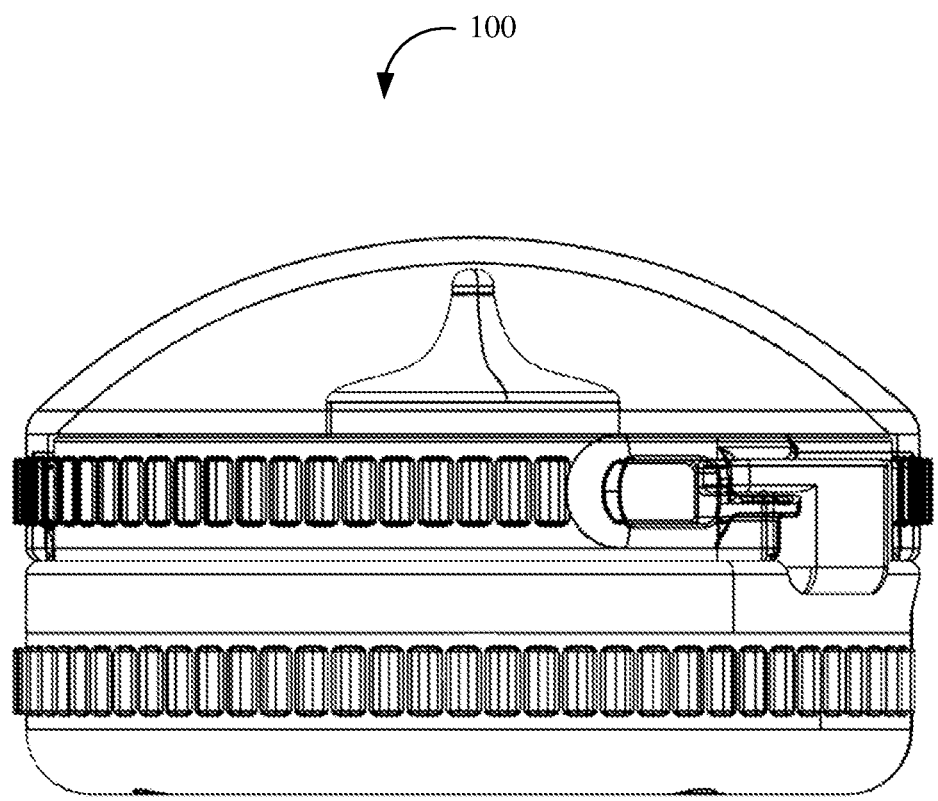
FIG. 5 is a rear view of the apparatus, in accordance with some embodiments.

FIG. 5 is a rear view of the apparatus 100, in accordance with some embodiments.

Figure 6:
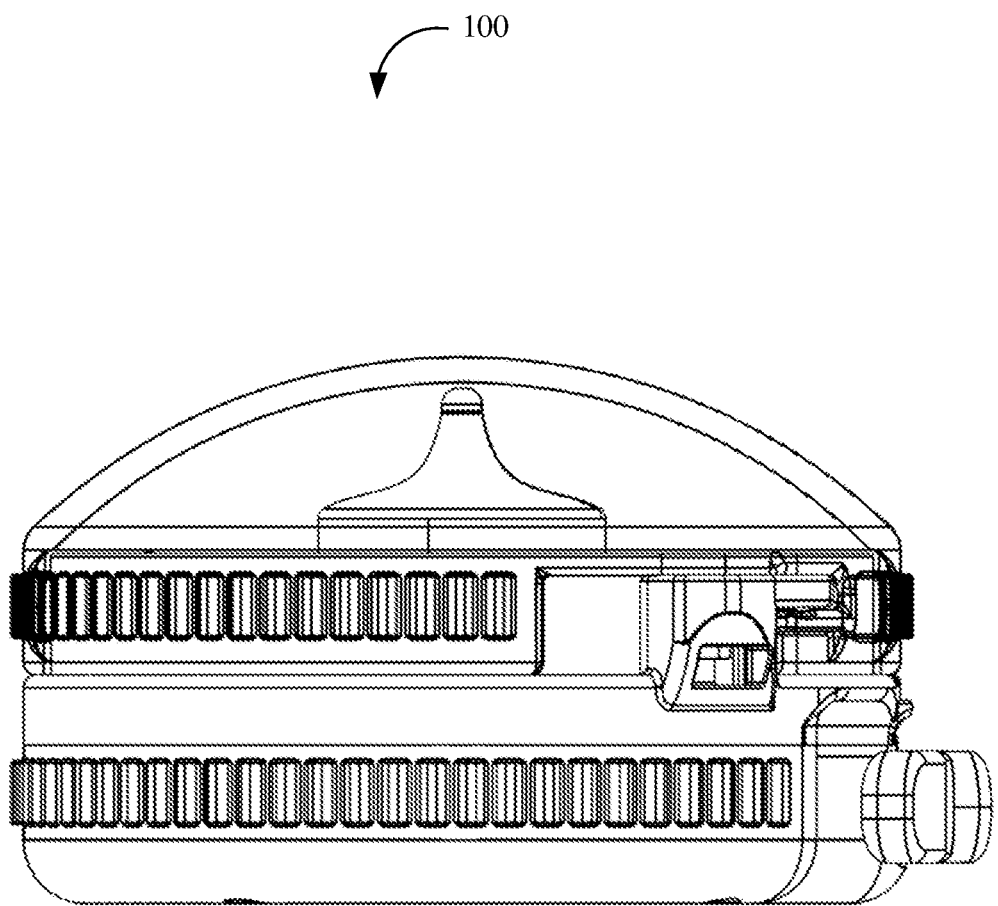
FIG. 6 is a left view of the apparatus, in accordance with some embodiments.

FIG. 6 is a left view of the apparatus 100, in accordance with some embodiments.

Figure 7:
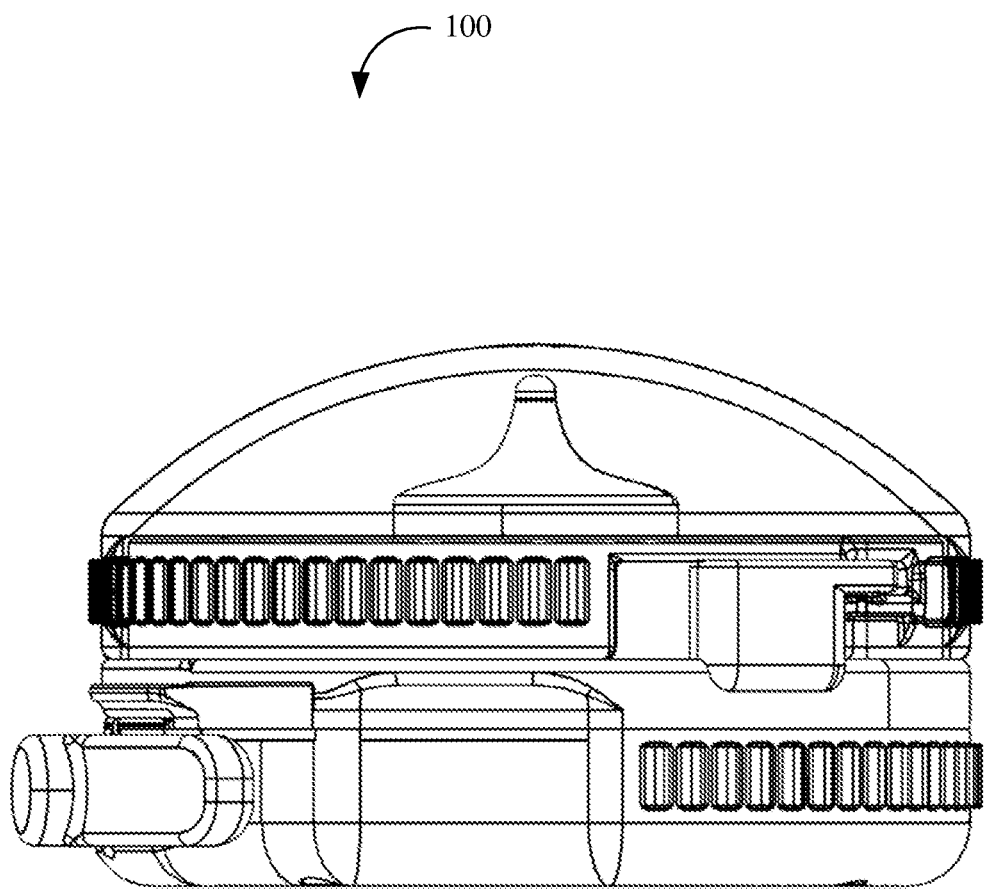
FIG. 7 is a right view of the apparatus, in accordance with some embodiments.

FIG. 7 is a right view of the apparatus 100, in accordance with some embodiments.

Figure 8:
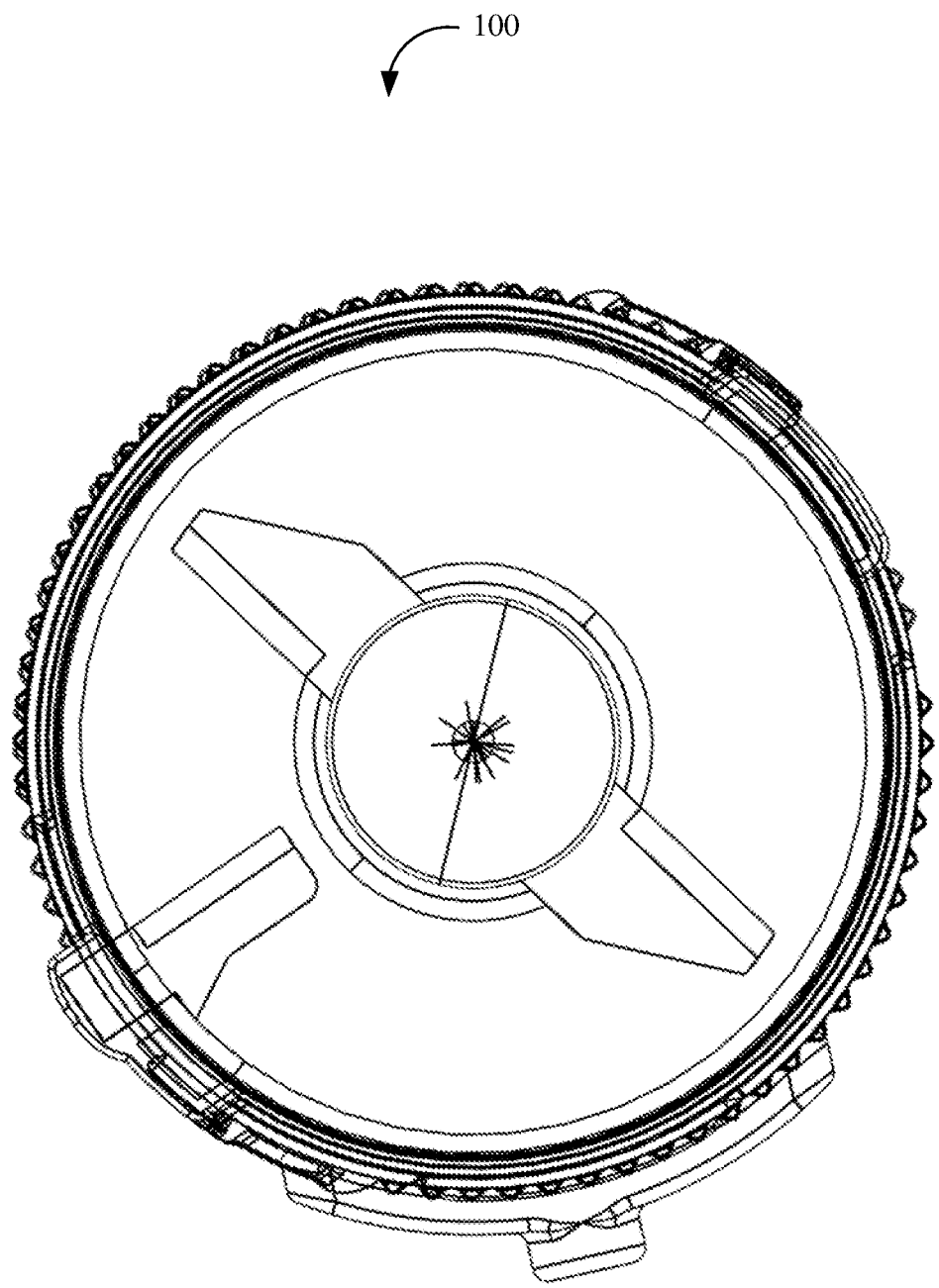
FIG. 8 is a top view of the apparatus, in accordance with some embodiments.

FIG. 8 is a top view of the apparatus 100, in accordance with some embodiments.

Figure 9:
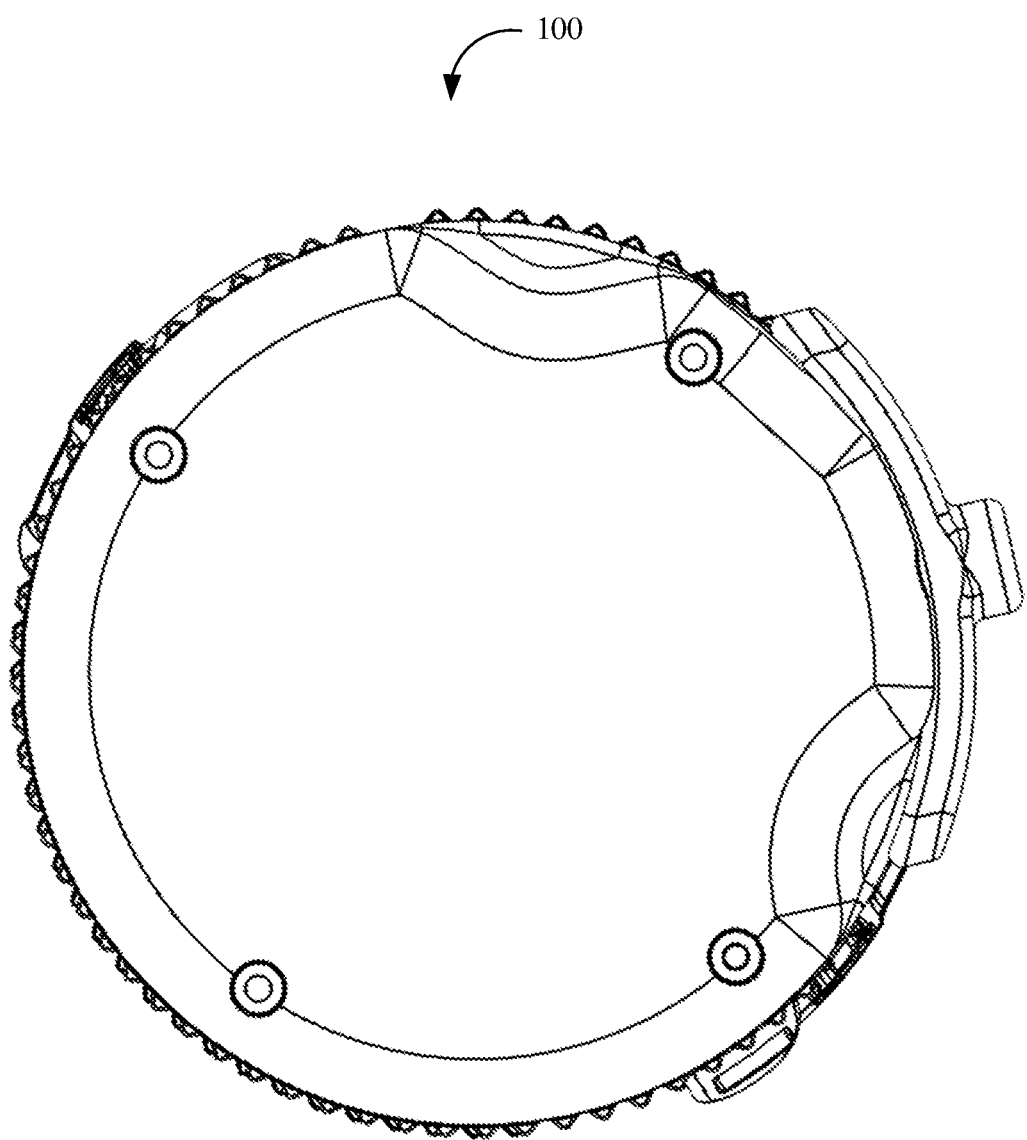
FIG. 9 is a bottom view of the apparatus, in accordance with some embodiments.

FIG. 9 is a bottom view of the apparatus 100, in accordance with some embodiments.

Figure 10:
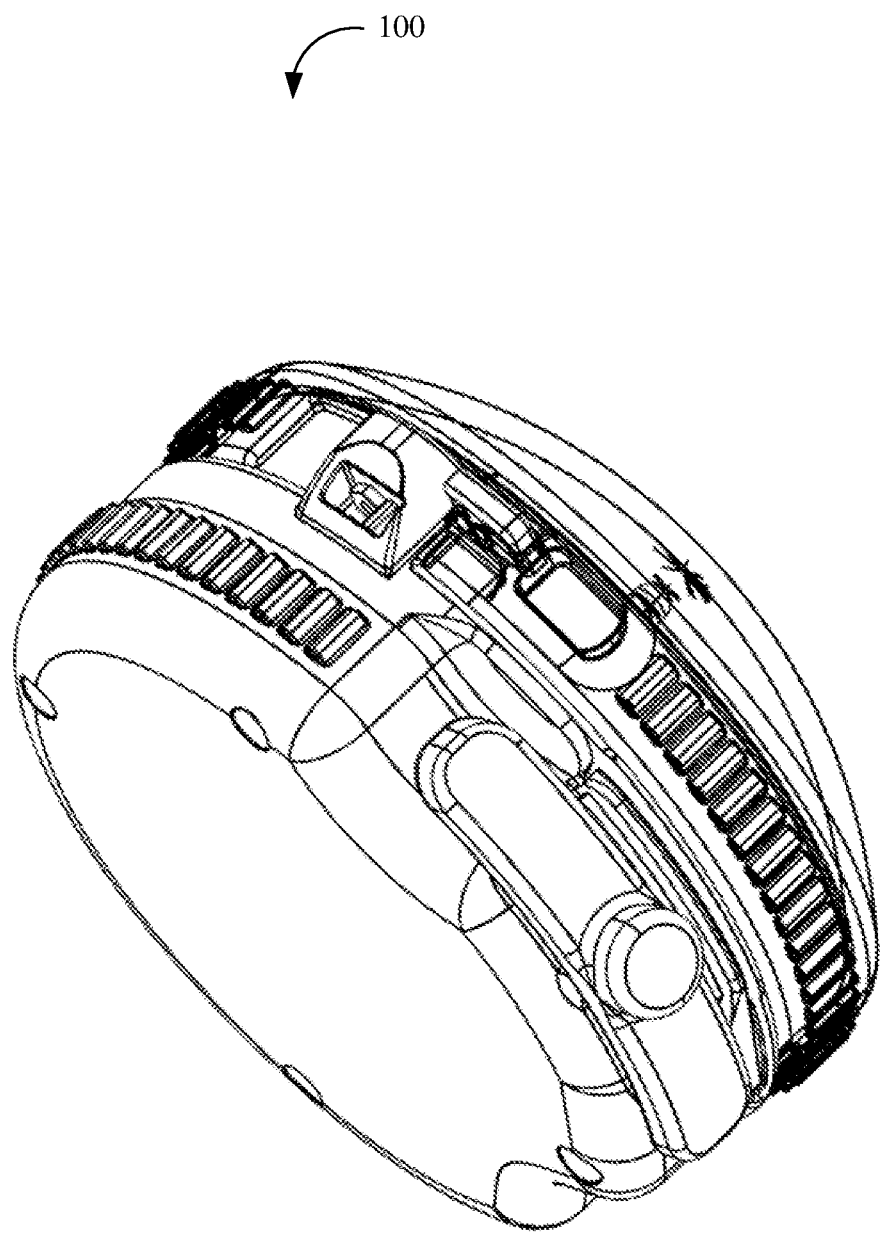
FIG. 10 is a bottom front perspective view of the apparatus, in accordance with some embodiments.

FIG. 10 is a bottom front perspective view of the apparatus 100, in accordance with some embodiments.

Figure 11:
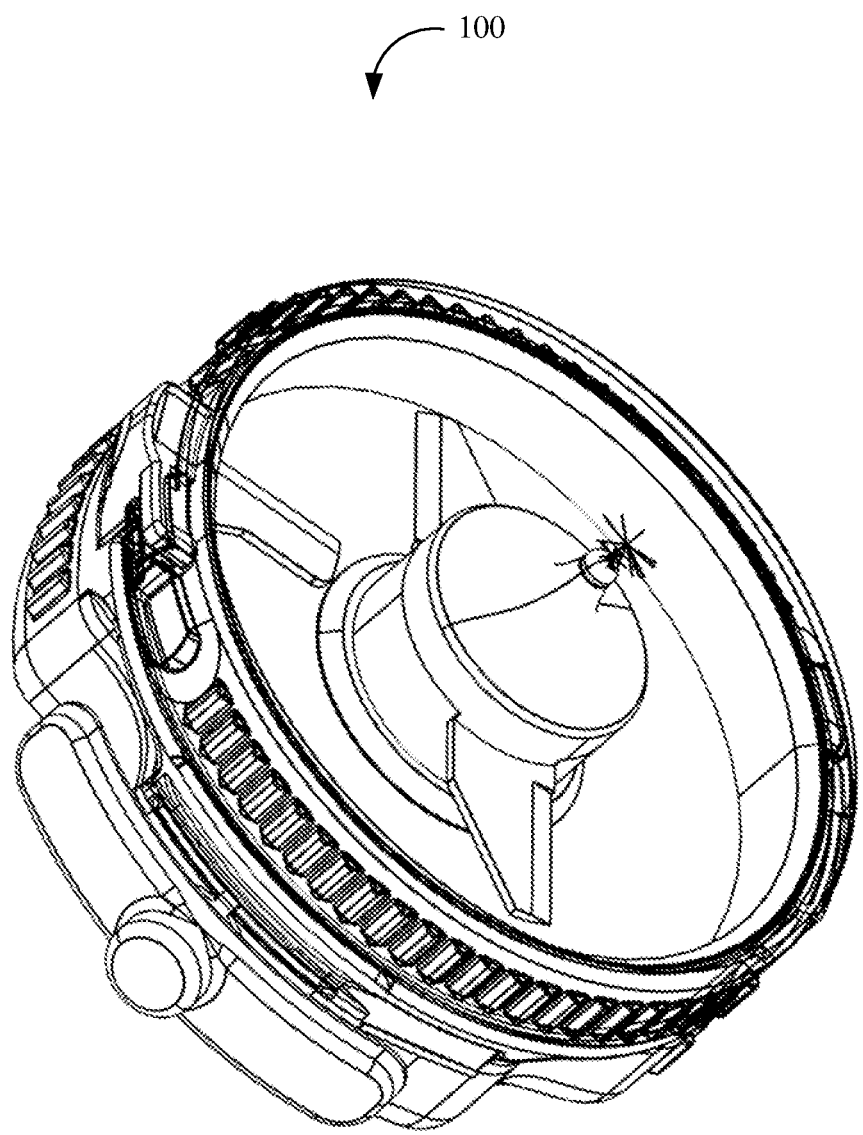
FIG. 11 is a top front perspective view of the apparatus, in accordance with some embodiments.

FIG. 11 is a top front perspective view of the apparatus 100, in accordance with some embodiments.

Figure 12:
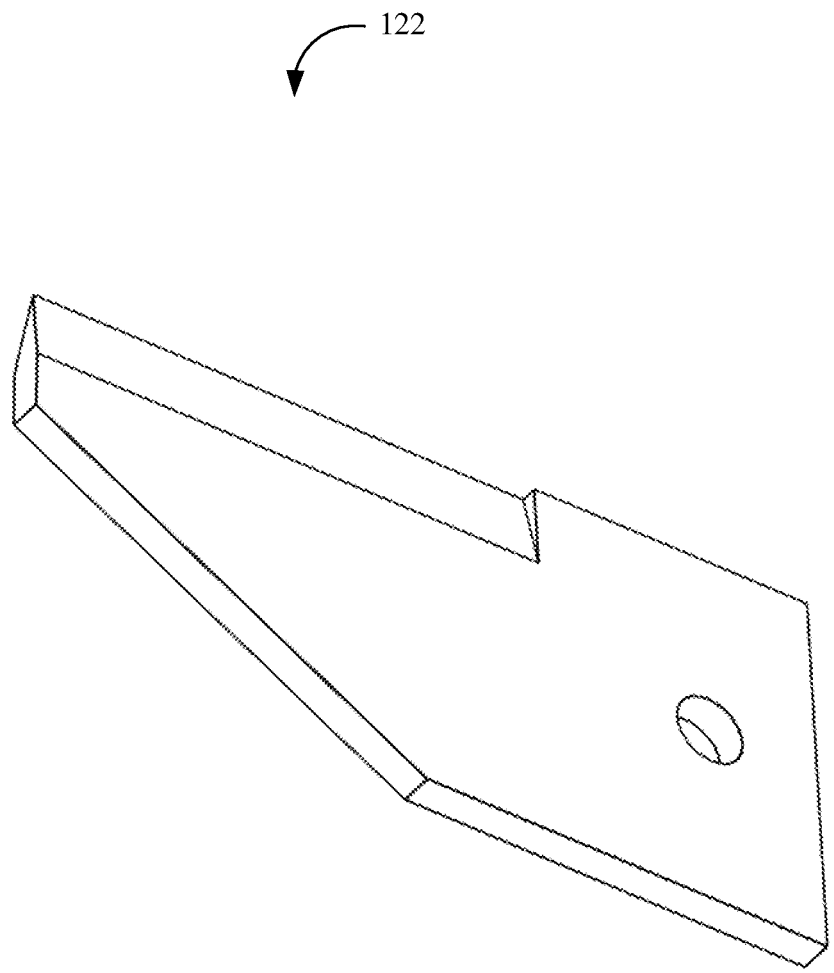
FIG. 12 is a top perspective view of the first blade, in accordance with some embodiments.

FIG. 12 is a top perspective view of the first blade 122, in accordance with some embodiments.

Figure 13:
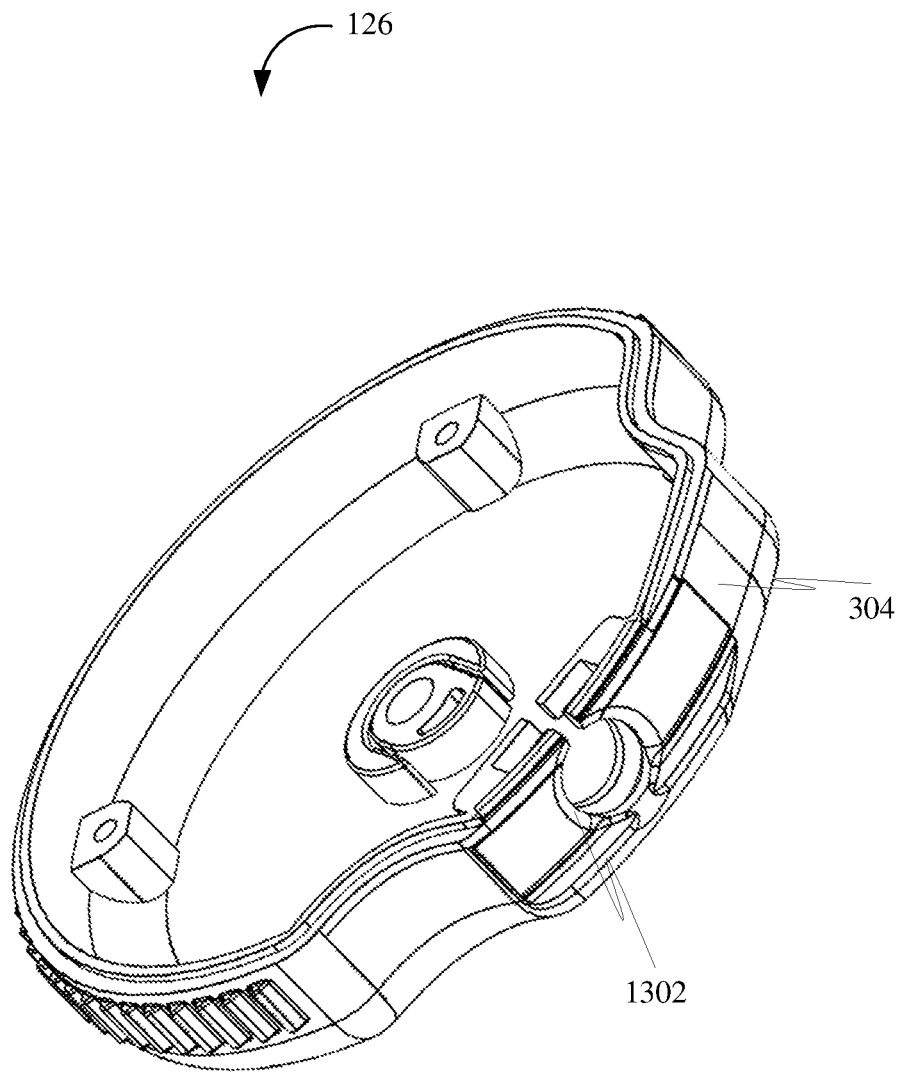
FIG. 13 is a front right side perspective view of the housing, in accordance with some embodiments.

FIG. 13 is a front right side perspective view of the housing 126, in accordance with some embodiments.

Figure 14:
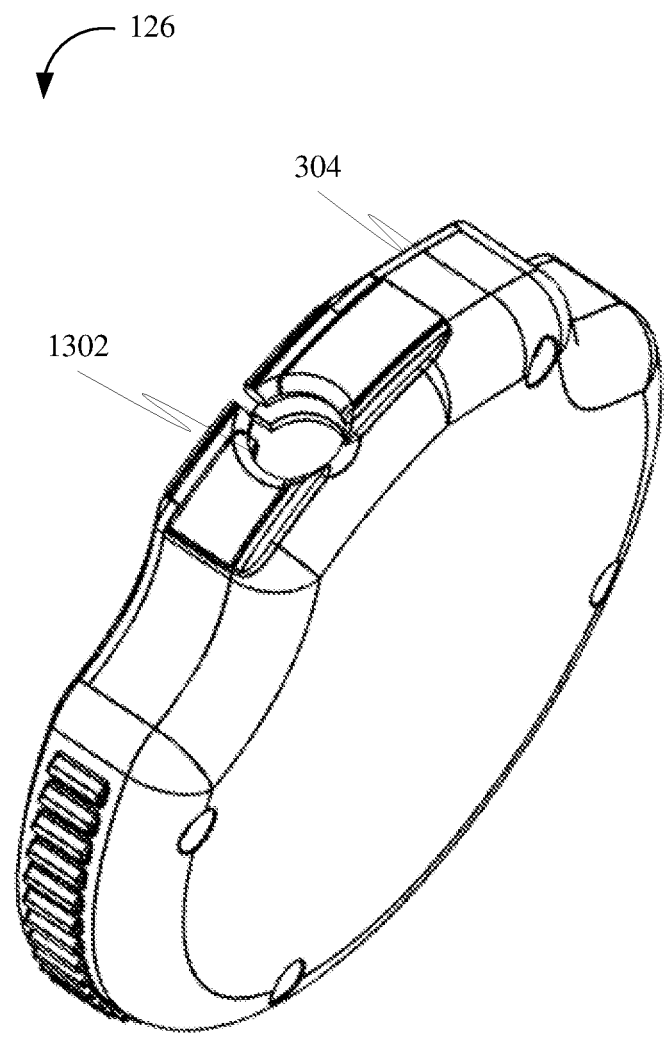
FIG. 14 is a rear right side perspective view of the housing, in accordance with some embodiments.

FIG. 14 is a rear right side perspective view of the housing 126, in accordance with some embodiments.

Figure 15:
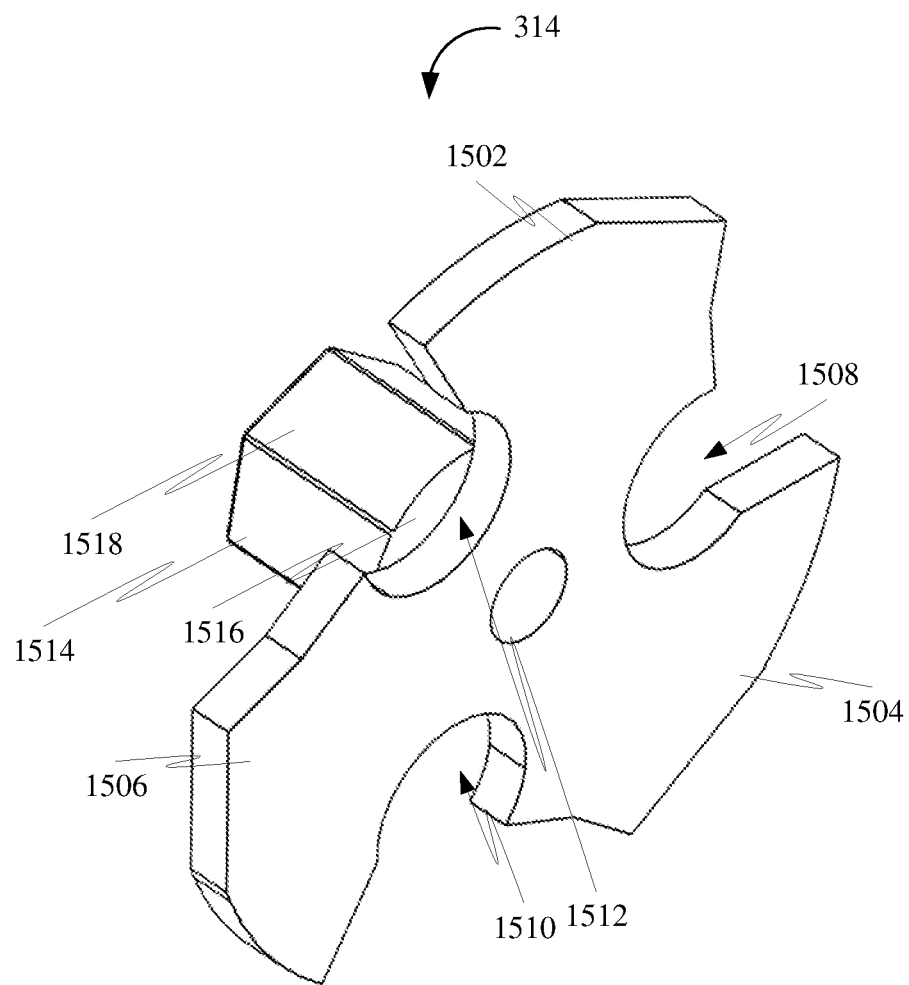
FIG. 15 is a rear right side perspective view of the clutch, in accordance with some embodiments.

FIG. 15 is a rear right side perspective view of the clutch 314, in accordance with some embodiments.

Figure 16:
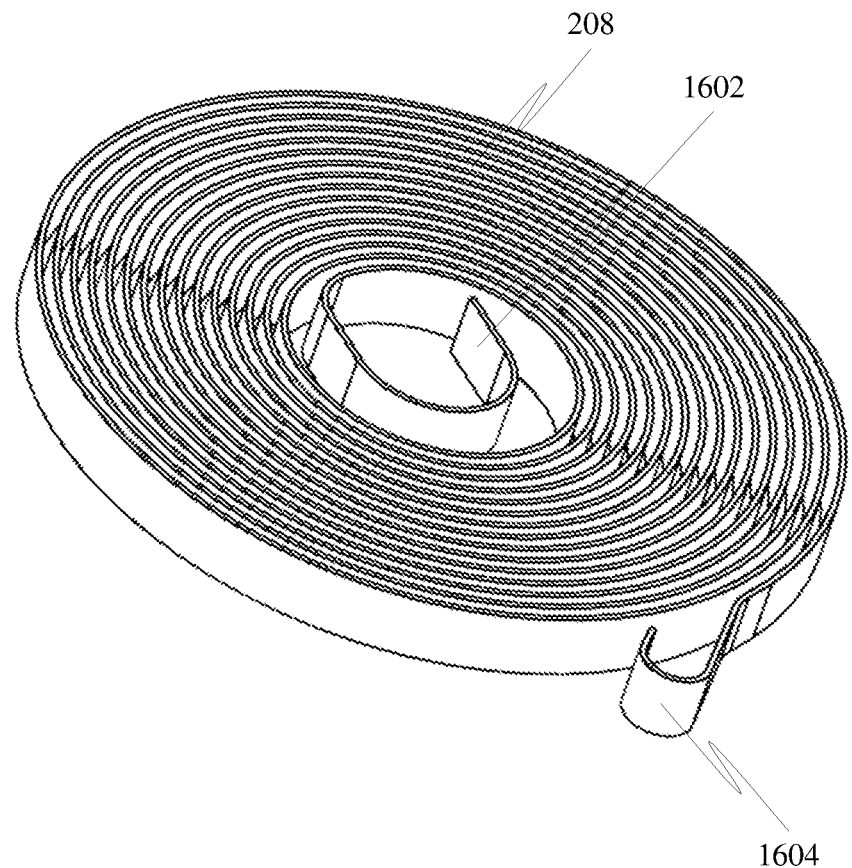
FIG. 16 is a front left side perspective view of the spiral spring, in accordance with some embodiments.

FIG. 16 is a front left side perspective view of the spiral spring 208, in accordance with some embodiments.

Figure 17:
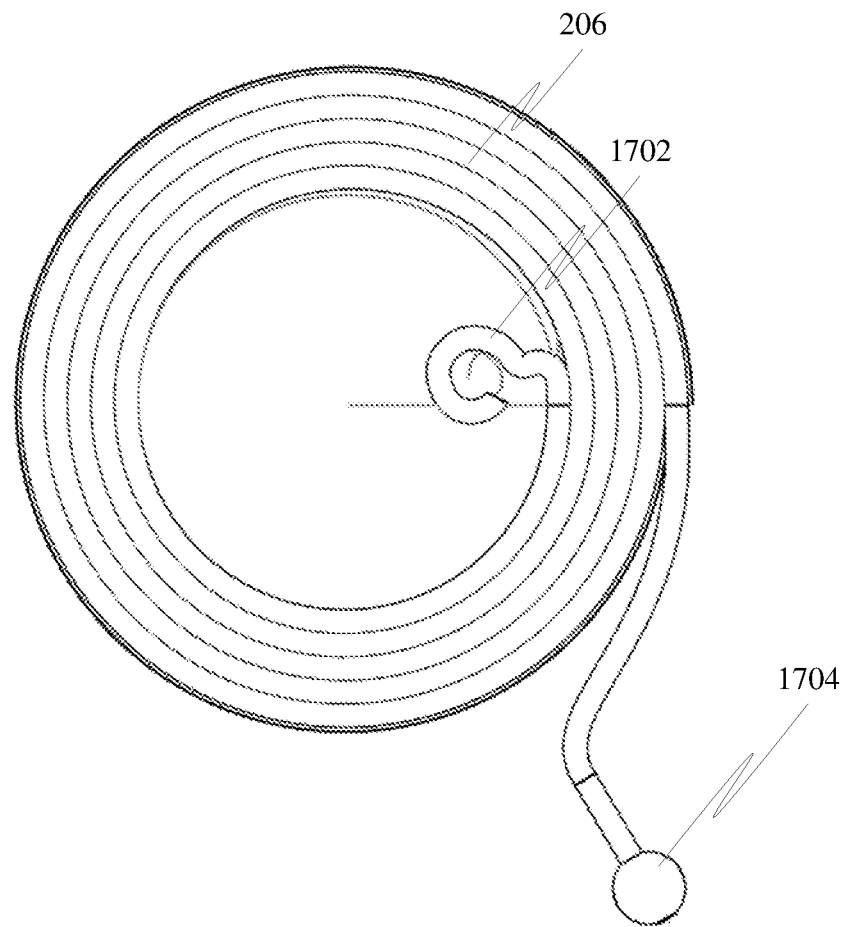
FIG. 17 is a front view of the cord coil, in accordance with some embodiments.

FIG. 17 is a front view of the cord coil 206, in accordance with some embodiments.

Figure 18:
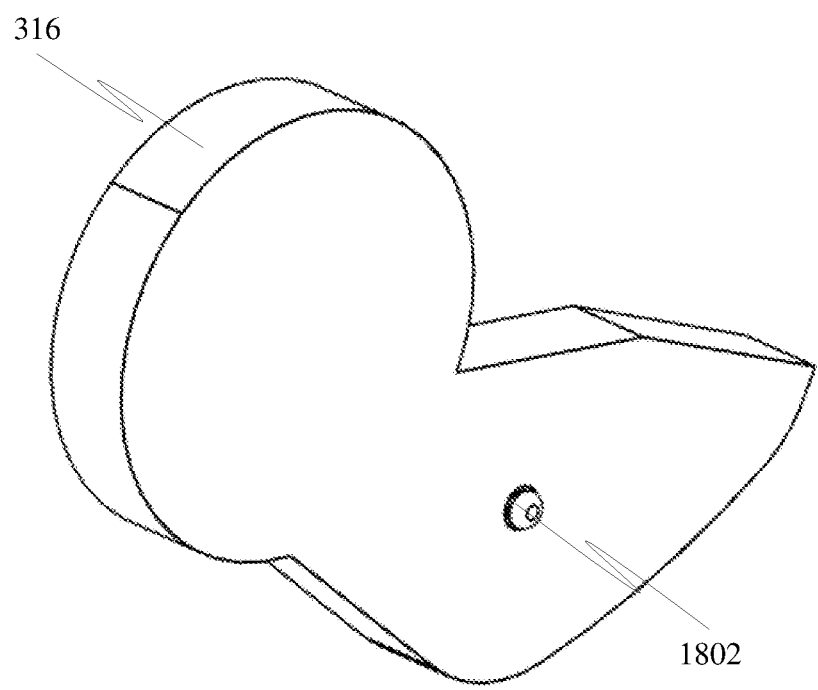
FIG. 18 is a front left side perspective view of a clutch lock of the plurality of clutch locks, in accordance with some embodiments.

FIG. 18 is a front left side perspective view of a clutch lock 316 of the plurality of clutch locks 316-320, in accordance with some embodiments.

Figure 19:
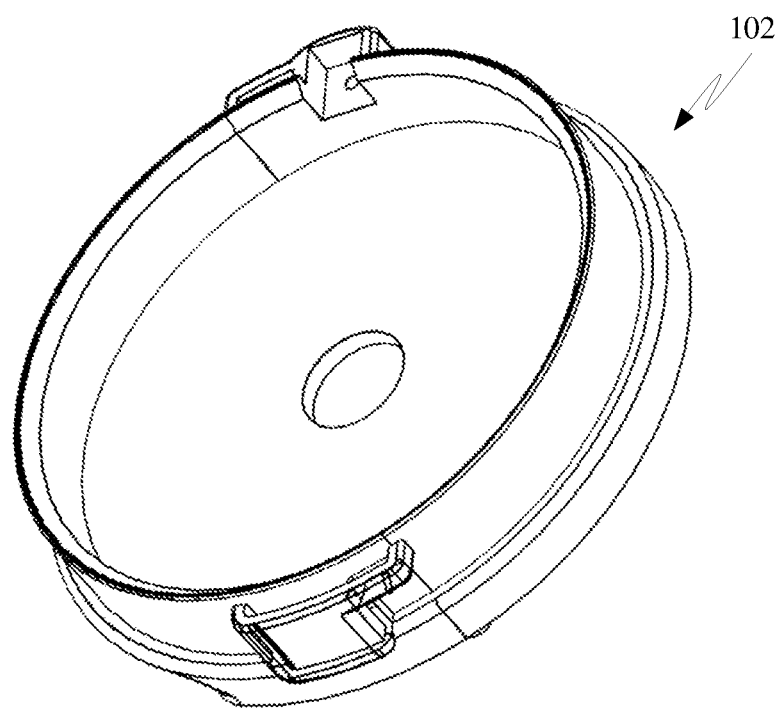
FIG. 19 is a front right side perspective view of the container, in accordance with some embodiments.

FIG. 19 is a front right side perspective view of the container 102, in accordance with some embodiments.

Figure 20:
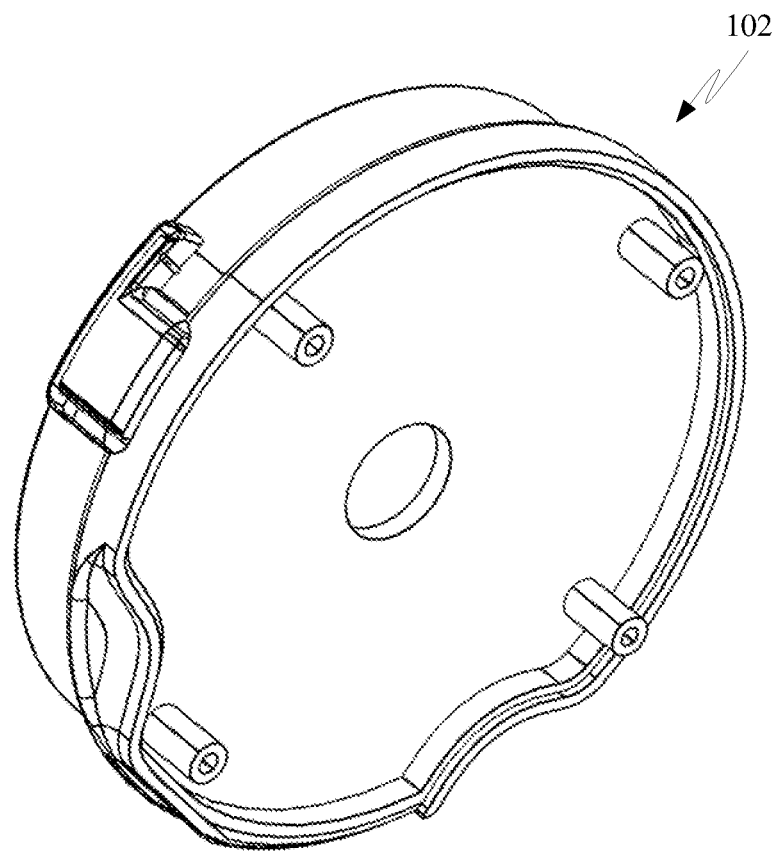
FIG. 20 is a rear right side perspective view of the container, in accordance with some embodiments.

FIG. 20 is a rear right side perspective view of the container 102, in accordance with some embodiments.

Figure 21:
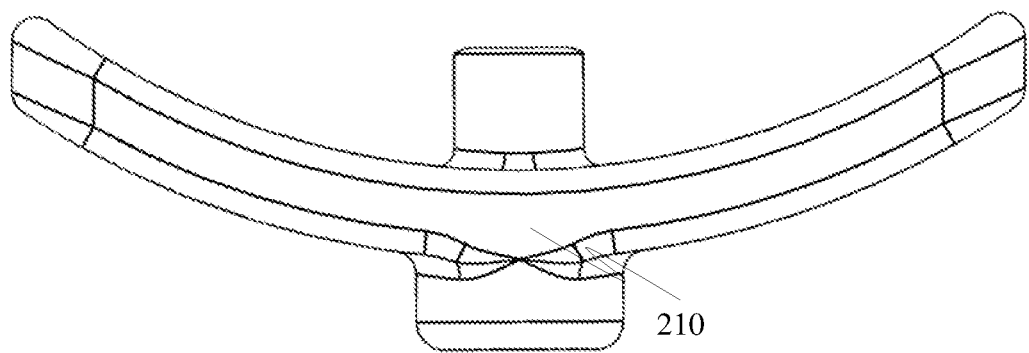
FIG. 21 is a front view of the handle, in accordance with some embodiments.

FIG. 21 is a front view of the handle 210, in accordance with some embodiments.

Figure 22:
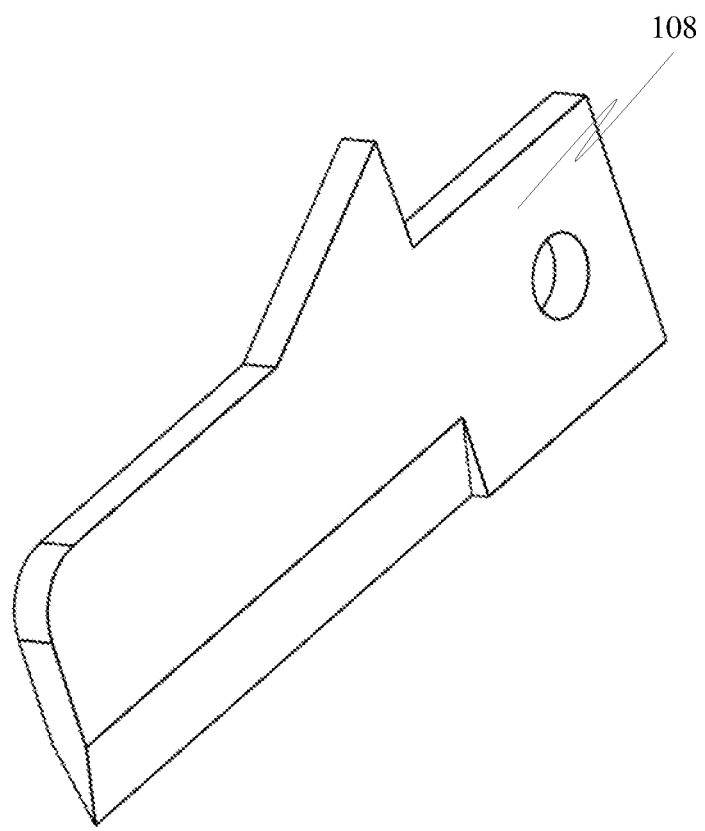
FIG. 22 is a front right side perspective view of the secondary blade, in accordance with some embodiments.

FIG. 22 is a front right side perspective view of the secondary blade 108, in accordance with some embodiments.

Figure 23:
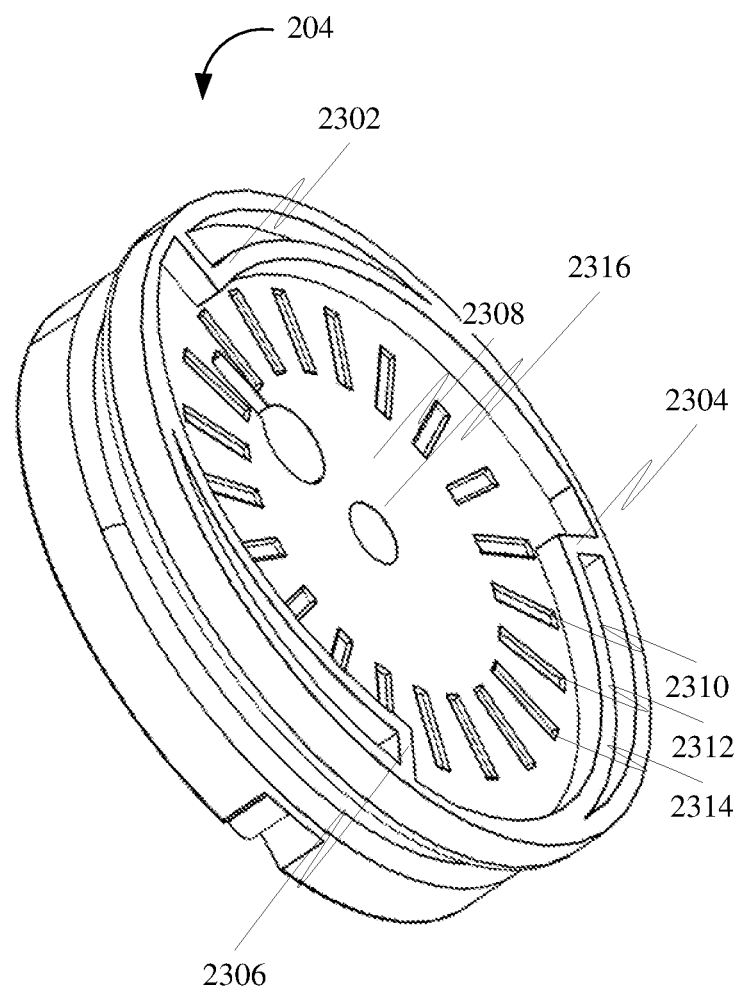
FIG. 23 is a front right side perspective view of the winder, in accordance with some embodiments.

FIG. 23 is a front right side perspective view of the winder 204, in accordance with some embodiments.

Figure 24:
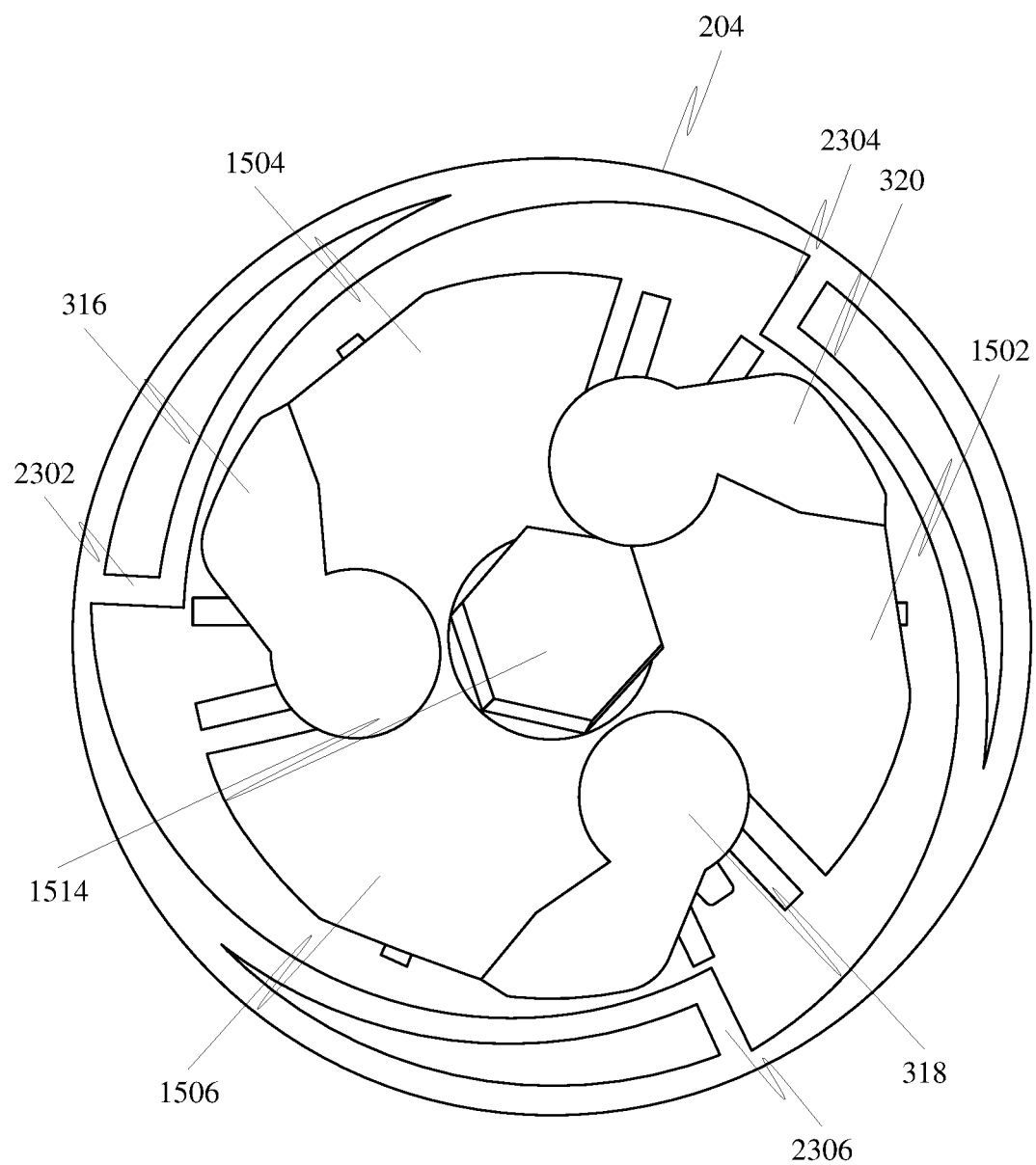
FIG. 24 is a front view of the winder with the plurality of clutch locks in the engaging position, in accordance with some embodiments.

FIG. 24 is a front view of the winder 204 with the plurality of clutch locks 316-320 in the engaging position, in accordance with some embodiments.

Figure 25:
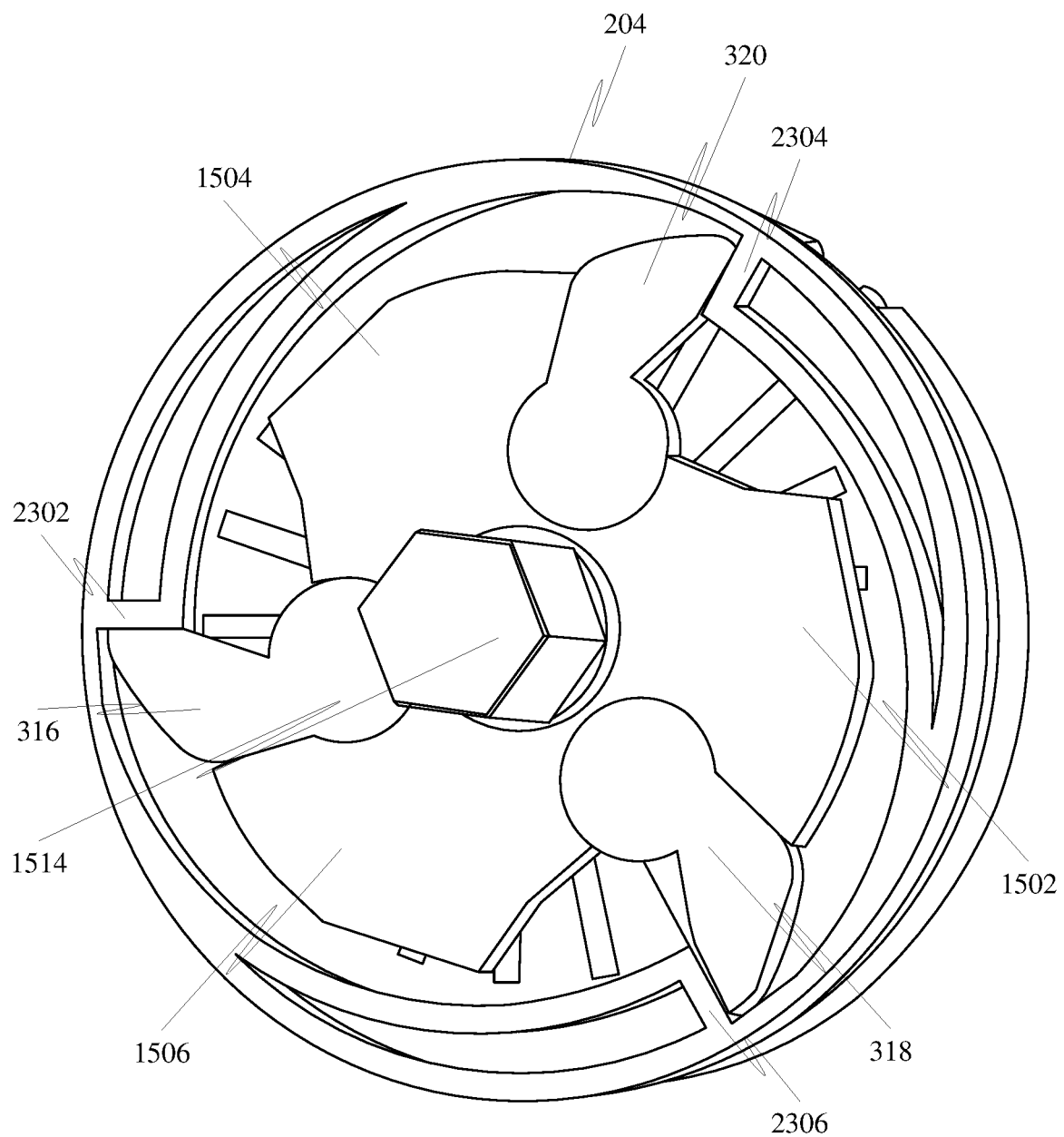
FIG. 25 is a front view of the winder with the plurality of clutch locks in the disengaging position, in accordance with some embodiments.

FIG. 25 is a front view of the winder 204 with the plurality of clutch locks 316-320 in the disengaging position, in accordance with some embodiments.

Figure 26:
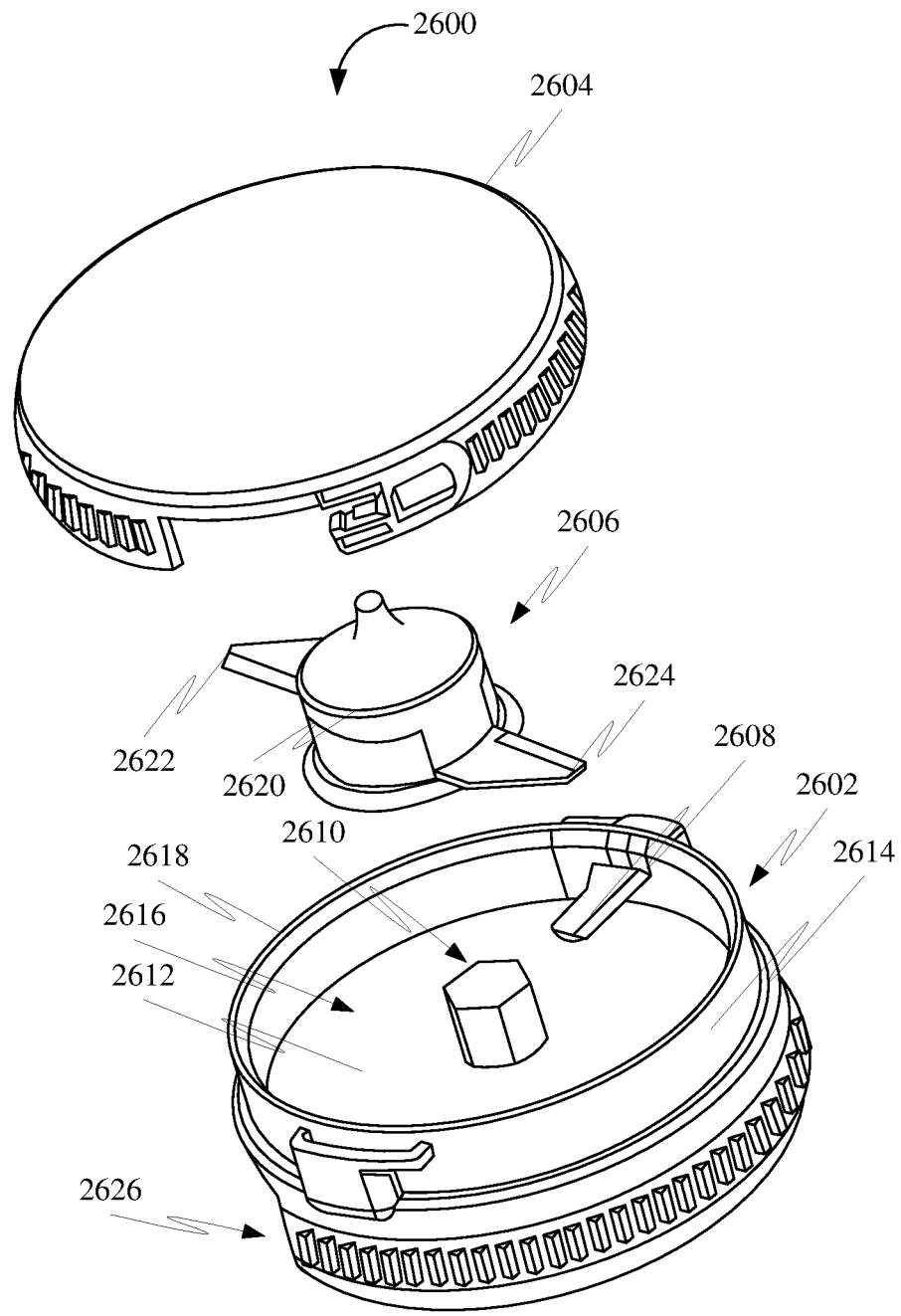
FIG. 26 is a right side perspective exploded view of an apparatus for facilitating grinding of grindable material, in accordance with some embodiments.

FIG. 26 is a right side perspective exploded view of an apparatus 2600 for facilitating grinding of grindable material, in accordance with some embodiments. Accordingly, the apparatus 2600 may include a container 2602, a lid 2604, a blade assembly 2606, a secondary blade 2608, and a rotating assembly 2610.

Further, the container 2602 may include a container base 2612 and a container side wall 2614 extending upwards from the container base 2612. Further, the container base 2612 and the container side wall 2614 define a container interior space 2616 and the container side wall 2614 defines a container opening 2618 leading into the container interior space 2616. Further, the container 2602 may be configured for receiving at least one grindable material in the container interior space 2616 through the container opening 2618.

Further, the lid 2604 may be configured to be removably attached to the container side wall 2614 for openably closing the container opening 2618.

Further, the blade assembly 2606 may be rotatably positioned within the container interior space 2616. Further, the blade assembly 2606 may include a shaft 2620 and a pair of blades 2622-2624 attached to the shaft 2620 and extending laterally oppositely from the shaft 2620. Further, the pair of blades 2622-2624 may be vertically spaced by a vertical distance. Further, the pair of blades 2622-2624 may include a first blade and a second blade. Further, the first blade may be vertically spaced above the second blade. Further, the second blade may be vertically spaced from the container base 2612 by a first vertical distance. Further, the first vertical distance ranges between 1 millimeter to 2 millimeters.

Further, the secondary blade 2608 may be attached to the container side wall 2614 and extends laterally from the container side wall 2614 in the container interior space 2616. Further, the secondary blade 2608 may be vertically spaced from each of the pair of blades 2622-2624 by a secondary vertical distance. Further, the secondary vertical distance between the secondary blade 2608 and each of the pair of blades 2622-2624 ranges between 1 millimeter to 3 millimeters.

Further, the rotating assembly 2610 may be attached to the container base 2612. Further, the rotating assembly 2610 may include a rotating mechanism and a pull cord. Further, the rotating mechanism may be coupled with the blade assembly 2606. Further, the pull cord may be operably coupled with the rotating mechanism. Further, the rotating mechanism may be configured for rotating the blade assembly 2606 for rotating the pair of blades 2622-2624 based on a pull force received by the pull cord. Further, the pair of blades 2622-2624 and the secondary blade 2608 grind the at least one grindable material in the container interior space 2616 based on the rotating of the pair of blades 2622-2624.

Further, in some embodiments, the apparatus 2600 may include a housing. Further, the housing may include a housing base and a housing side wall extending upwards from the housing base. Further, the housing side wall may be attached to the container base 2612. Further, the housing base, the housing side wall, and the container base 2612 define a housing interior space. Further, the rotating mechanism may be disposed within the housing interior space.

Further, in an embodiment, the housing side wall may be detachably attached to the container base 2612.

Further, in an embodiment, the housing may include a housing shaft and a winder. Further, the housing shaft may be disposed in the housing interior space. Further, the housing shaft may be attached to the housing base and perpendicularly extends from the housing base. Further, the housing shaft may include a fixed end attached to the housing base and a free end. Further, the winder may be coaxially and rotatably disposed around the housing shaft in the housing interior space. Further, the winder may be cylindrically shaped. Further, the winder may include at least one annular groove on a curved surface of the winder. Further, a first end of the pull cord may be coupled to the winder and a second end extends exterior to the housing through a housing opening in the housing side wall and attached to a handle. Further, the pull cord receives the pull force through the handle. Further, the at least one annular groove receives at least one portion of the pull cord for winding the at least one portion of the pull cord around the winder. Further, the at least one portion of the pull cord unwinds based on the pull force received by the pull cord using the handle for rotating the winder in a counterclockwise direction. Further, the rotating of the blade assembly 2606 may be based on the rotating of the winder in the counterclockwise direction.

Further, in an embodiment, the rotating mechanism further may include a spiral spring coaxially disposed around the housing shaft between the housing base and the winder. Further, a first end of the spiral spring may be attached to the housing shaft and a second end 1604 of the spiral spring may be attached to the winder. Further, the spiral spring may be configured for transitioning from an expanded state to a compressed state based on the rotating of the winder in the counterclockwise direction. Further, the spiral spring may be configured for transitioning from the compressed state to the expanded state based on a removal of the pull force. Further, the spiral spring may be configured for rotating the winder in a clockwise direction for rewinding the at least one portion of the pull cord around the winder based on the transitioning of the spiral spring from the compressed state to the expanded state.

Further, in an embodiment, the rotating mechanism further may include a clutch assembly disposed on the winder. Further, the clutch assembly may be configured for coupling the blade assembly 2606 with the winder. Further, the rotating of the blade assembly 2606 based on the rotating of the winder in the counterclockwise direction may be based on the coupling. Further, the clutch assembly may be configured for providing a mechanical advantage for the rotating of the blade assembly 2606 based on the rotating of the winder in the counterclockwise direction.

Further, in an embodiment, the clutch assembly may include a clutch. Further, the clutch may include a clutch stud and a plurality of clutch blades attached to a bottom portion of the clutch stud and extends radially from the bottom portion of the clutch stud. Further, the clutch may include a clutch space adjacent to each of the plurality of clutch blades. Further, the clutch stud may be rotatably mounted on the free end of the housing shaft. Further, a top portion of the clutch stud extends into the container interior space 2616 through a base opening in the container base 2612. Further, the shaft 2620 of the blade assembly 2606 may be configured to be attached to the top portion of the clutch stud.

Further, in an embodiment, the clutch assembly may include a plurality of clutch locks. Further, each of the plurality of clutch locks may be pivotably disposed in the clutch space. Further, each of the plurality of clutch locks may include a boss. Further, the boss engages with one of a plurality of grooves radially disposed on a top surface of the winder. Further, each of the plurality of clutch locks pivots to an engaging position for engaging with a plurality of lock walls peripherally disposed on the top surface of the winder based on the rotating of the winder in the counterclockwise direction. Further, the engaging of each of the plurality of clutch locks with the plurality of lock walls rotates the clutch assembly with the winder for the rotating of the blade assembly 2606. Further, each of the plurality of locks pivots to a disengaging position for disengaging with the plurality of lock walls based on the rotating of the winder in the counterclockwise direction. Further, the disengaging of each of the plurality of clutch locks with the plurality of lock walls does not rotate the clutch assembly with the winder.

Further, in an embodiment, the providing of the mechanical advantage for the rotating of the blade assembly 2606 may be based on the engaging of each of the plurality of clutch locks with the plurality of lock walls. Further, the mechanical advantage corresponds to a radial distance of the plurality of lock walls on the top surface of the winder from a center of the top surface of the winder. Further, the radial distance may be a maximum radial distance based on the peripherally disposing of the plurality of lock walls on the top surface of the winder. Further, the mechanical advantage may be a maximum mechanical advantage corresponding to the maximum radial distance based on the peripherally disposing of the plurality of lock walls on the top surface of the winder.

Further, in an embodiment, the shaft 2620 of the blade assembly 2606 may be configured to be removably attached with the top portion of the clutch stud for detachably coupling the blade assembly 2606 to the rotating assembly 2610.

Although the present disclosure has been explained in relation to its preferred embodiment, it is to be understood that many other possible modifications and variations can be made without departing from the spirit and scope of the disclosure.

What is claimed is:

1. An apparatus for facilitating grinding of grindable material, the apparatus comprising:
    a container comprising a container base and a container side wall extending upwards from the container base, wherein the container base and the container side wall define a container interior space and the container side wall defines a container opening leading into the container interior space, wherein the container is configured for receiving at least one grindable material in the container interior space through the container opening;
    a lid configured to be removably attached to the container side wall for openably closing the container opening;
    a blade assembly rotatably positioned within the container interior space, wherein the blade assembly comprises a shaft and a pair of blades attached to the shaft and extending laterally oppositely from the shaft, wherein the pair of blades are vertically spaced by a vertical distance;
    a secondary blade attached to the container side wall and extends laterally from the container side wall in the container interior space, wherein the secondary blade is vertically spaced from each of the pair of blades by a secondary vertical distance; and
    a rotating assembly attached to the container base, wherein the rotating assembly comprises a rotating mechanism and a pull cord, wherein the rotating mechanism is coupled with the blade assembly, wherein the pull cord is operably coupled with the rotating mechanism, wherein the rotating mechanism is configured for rotating the blade assembly for rotating the pair of blades based on a pull force received by the pull cord, wherein the pair of blades and the secondary blade grind the at least one grindable material in the container interior space based on the rotating of the pair of blades.

2. The apparatus of claim 1 further comprising a housing, wherein the housing comprises a housing base and a housing side wall extending upwards from the housing base, wherein the housing side wall is attached to the container base, wherein the housing base, the housing side wall, and the container base define a housing interior space, wherein the rotating mechanism is disposed within the housing interior space.

3. The apparatus of claim 2, wherein the housing side wall is detachably attached to the container base.

4. The apparatus of claim 2, wherein the housing comprises:
    a housing shaft disposed in the housing interior space, wherein the housing shaft is attached to the housing base and perpendicularly extends from the housing base, wherein the housing shaft comprises a fixed end attached to the housing base and a free end; and a winder coaxially and rotatably disposed around the housing shaft in the housing interior space, wherein the winder is cylindrically shaped, wherein the winder comprises at least one annular groove on a curved surface of the winder, wherein a first end of the pull cord is coupled to the winder and a second end extends exterior to the housing through a housing opening in the housing side wall and attached to a handle, wherein the pull cord receives the pull force through the handle, wherein the at least one annular groove receives at least one portion of the pull cord for winding the at least one portion of the pull cord around the winder, wherein the at least one portion of the pull cord unwinds based on the pull force received by the pull cord using the handle for rotating the winder in a counterclockwise direction, wherein the rotating of the blade assembly is based on the rotating of the winder in the counterclockwise direction.

5. The apparatus of claim 4, wherein the rotating mechanism further comprises a spiral spring coaxially disposed around the housing shaft between the housing base and the winder, wherein a first end of the spiral spring is attached to the housing shaft and a second end of the spiral spring is attached to the winder, wherein the spiral spring is configured for transitioning from an expanded state to a compressed state based on the rotating of the winder in the counterclockwise direction, wherein the spiral spring is configured for transitioning from the compressed state to the expanded state based on a removal of the pull force, wherein the spiral spring is configured for rotating the winder in a clockwise direction for rewinding the at least one portion of the pull cord around the winder based on the transitioning of the spiral spring from the compressed state to the expanded state.

6. The apparatus of claim 5, wherein the rotating mechanism further comprises a clutch assembly disposed on the winder, wherein the clutch assembly is configured for coupling the blade assembly with the winder, wherein the rotating of the blade assembly based on the rotating of the winder in the counterclockwise direction is based on the coupling, wherein the clutch assembly is configured for providing a mechanical advantage for the rotating of the blade assembly based on the rotating of the winder in the counterclockwise direction.

7. The apparatus of claim 6, wherein the clutch assembly comprises a clutch, wherein the clutch comprises a clutch stud and a plurality of clutch blades attached to a bottom portion of the clutch stud and extends radially from the bottom portion of the clutch stud, wherein the clutch comprises a clutch space adjacent to each of the plurality of clutch blades, wherein the clutch stud is rotatably mounted on the free end of the housing shaft, wherein a top portion of the clutch stud extends into the container interior space through a base opening in the container base, wherein the shaft of the blade assembly is configured to be attached to the top portion of the clutch stud.

8. The apparatus of claim 7, wherein the clutch assembly comprises a plurality of clutch locks, wherein each of the plurality of clutch locks is pivotably disposed in the clutch space, wherein each of the plurality of clutch locks comprises a boss, wherein the boss engages with one of a plurality of grooves radially disposed on a top surface of the winder, wherein each of the plurality of clutch locks pivots to an engaging position for engaging with a plurality of lock walls peripherally disposed on the top surface of the winder based on the rotating of the winder in the counterclockwise direction, wherein the engaging of each of the plurality of clutch locks with the plurality of lock walls rotates the clutch assembly with the winder for the rotating of the blade assembly, wherein each of the plurality of locks pivots to a disengaging position for disengaging with the plurality of lock walls based on the rotating of the winder in the counterclockwise direction, wherein the disengaging of each of the plurality of clutch locks with the plurality of lock walls does not rotate the clutch assembly with the winder.

9. The method of claim 8, wherein the providing of the mechanical advantage for the rotating of the blade assembly is based on the engaging of each of the plurality of clutch locks with the plurality of lock walls, wherein the mechanical advantage corresponds to a radial distance of the plurality of lock walls on the top surface of the winder from a center of the top surface of the winder, wherein the radial distance is a maximum radial distance based on the peripherally disposing of the plurality of lock walls on the top surface of the winder, wherein the mechanical advantage is a maximum mechanical advantage corresponding to the maximum radial distance based on the peripherally disposing of the plurality of lock walls on the top surface of the winder.

10. The method of claim 7, wherein the shaft of the blade assembly is configured to be removably attached with the top portion of the clutch stud for detachably coupling the blade assembly to the rotating assembly.

11. The method of claim 1, wherein the secondary vertical distance between the secondary blade and each of the pair of blades ranges between 1 millimeter to 3 millimeters.

12. The method of claim 1, wherein the pair of blades comprises a first blade and a second blade, wherein the first blade is vertically spaced above the second blade, wherein the second blade is vertically spaced from the container base by a first vertical distance, wherein the first vertical distance ranges between 1 millimeter to 2 millimeters.

13. An apparatus for facilitating grinding of grindable material, the apparatus comprising:
a container comprising a container base and a container side wall extending upwards from the container base, wherein the container base and the container side wall define a container interior space and the container side wall defines a container opening leading into the container interior space, wherein the container is configured for receiving at least one grindable material in the container interior space through the container opening;
a lid configured to be removably attached to the container side wall for openably closing the container opening;
a blade assembly rotatably positioned within the container interior space, wherein the blade assembly comprises a shaft and a pair of blades attached to the shaft and extending laterally oppositely from the shaft, wherein the pair of blades are vertically spaced by a vertical distance, wherein the pair of blades comprises a first blade and a second blade, wherein the first blade is vertically spaced above the second blade, wherein the second blade is vertically spaced from the container base by a first vertical distance, wherein the first vertical distance ranges between 1 millimeter to 2 millimeters;
a secondary blade attached to the container side wall and extends laterally from the container side wall in the container interior space, wherein the secondary blade is vertically spaced from each of the pair of blades by a secondary vertical distance, wherein the secondary vertical distance between the secondary blade and each of the pair of blades ranges between 1 millimeter to 3 millimeters; and a rotating assembly attached to the container base, wherein the rotating assembly comprises a rotating mechanism and a pull cord, wherein the rotating mechanism is coupled with the blade assembly, wherein the pull cord is operably coupled with the rotating mechanism, wherein the rotating mechanism is configured for rotating the blade assembly for rotating the pair of blades based on a pull force received by the pull cord, wherein the pair of blades and the secondary blade grind the at least one grindable material in the container interior space based on the rotating of the pair of blades.

14. The apparatus of claim 13 further comprising a housing, wherein the housing comprises a housing base and a housing side wall extending upwards from the housing base, wherein the housing side wall is attached to the container base, wherein the housing base, the housing side wall, and the container base define a housing interior space, wherein the rotating mechanism is disposed within the housing interior space.

15. The apparatus of claim 14, wherein the housing side wall is detachably attached to the container base.

16. The apparatus of claim 14, wherein the housing comprises:
a housing shaft disposed in the housing interior space, wherein the housing shaft is attached to the housing base and perpendicularly extends from the housing base, wherein the housing shaft comprises a fixed end attached to the housing base and a free end; and
a winder coaxially and rotatably disposed around the housing shaft in the housing interior space, wherein the winder is cylindrically shaped, wherein the winder comprises at least one annular groove on a curved surface of the winder, wherein a first end of the pull cord is coupled to the winder and a second end extends exterior to the housing through a housing opening in the housing side wall and attached to a handle, wherein the pull cord receives the pull force through the handle, wherein the at least one annular groove receives at least one portion of the pull cord for winding the at least one portion of the pull cord around the winder, wherein the at least one portion of the pull cord unwinds based on the pull force received by the pull cord using the handle for rotating the winder in a counterclockwise direction, wherein the rotating of the blade assembly is based on the rotating of the winder in the counterclockwise direction.

17. The apparatus of claim 16, wherein the rotating mechanism further comprises a spiral spring coaxially disposed around the housing shaft between the housing base and the winder, wherein a first end of the spiral spring is attached to the housing shaft and a second end of the spiral spring is attached to the winder, wherein the spiral spring is configured for transitioning from an expanded state to a compressed state based on the rotating of the winder in the counterclockwise direction, wherein the spiral spring is configured for transitioning from the compressed state to the expanded state based on a removal of the pull force, wherein the spiral spring is configured for rotating the winder in a clockwise direction for rewinding the at least one portion of the pull cord around the winder based on the transitioning of the spiral spring from the compressed state to the expanded state.

18. The apparatus of claim 17, wherein the rotating mechanism further comprises a clutch assembly disposed on the winder, wherein the clutch assembly is configured for coupling the blade assembly with the winder, wherein the rotating of the blade assembly based on the rotating of the winder in the counterclockwise direction is based on the coupling, wherein the clutch assembly is configured for providing a mechanical advantage for the rotating of the blade assembly based on the rotating of the winder in the counterclockwise direction.

19. The apparatus of claim 18, wherein the clutch assembly comprises a clutch, wherein the clutch comprises a clutch stud and a plurality of clutch blades attached to a bottom portion of the clutch stud and extends radially from the bottom portion of the clutch stud, wherein the clutch comprises a clutch space adjacent to each of the plurality of clutch blades, wherein the clutch stud is rotatably mounted on the free end of the housing shaft, wherein a top portion of the clutch stud extends into the container interior space through a base opening in the container base, wherein the shaft of the blade assembly is configured to be attached to the top portion of the clutch stud.

20. The apparatus of claim 19, wherein the clutch assembly comprises a plurality of clutch locks, wherein each of the plurality of clutch locks is pivotably disposed in the clutch space, wherein each of the plurality of clutch locks comprises a boss, wherein the boss engages with one of a plurality of grooves radially disposed on a top surface of the winder, wherein each of the plurality of clutch locks pivots to an engaging position for engaging with a plurality of lock walls peripherally disposed on the top surface of the winder based on the rotating of the winder in the counterclockwise direction, wherein the engaging of each of the plurality of clutch locks with the plurality of lock walls rotates the clutch assembly with the winder for the rotating of the blade assembly, wherein each of the plurality of locks pivots to a disengaging position for disengaging with the plurality of lock walls based on the rotating of the winder in the counterclockwise direction, wherein the disengaging of each of the plurality of clutch locks with the plurality of lock walls does not rotate the clutch assembly with the winder.

* * * * *